(12) United States Patent
Dahn et al.

(10) Patent No.: US 12,401,059 B2
(45) Date of Patent: Aug. 26, 2025

(54) BATTERY SYSTEMS BASED ON TWO-ADDITIVE ELECTROLYTE SYSTEMS INCLUDING 1,2,6-OXODITHIANE-2,2,6,6-TETRAOXIDE

(71) Applicant: Tesla Motors Canada ULC, North York (CA)

(72) Inventors: Jeffery Raymond Dahn, Halifax (CA); Xiaowei Ma, Halifax (CA); Stephen Laurence Glazier, Halifax (CA); Robert Scott Young, New Glasgow (CA)

(73) Assignees: Tesla, Inc., Austin, TX (US); Panasonic Holdings Corporation, Osaka (JP)

( * ) Notice: Subject to any disclaimer, the term of this patent is extended or adjusted under 35 U.S.C. 154(b) by 115 days.

(21) Appl. No.: 16/057,119

(22) Filed: Aug. 7, 2018

(65) Prior Publication Data
US 2019/0280334 A1 Sep. 12, 2019

Related U.S. Application Data

(60) Provisional application No. 62/702,549, filed on Jul. 24, 2018, provisional application No. 62/641,957, filed on Mar. 12, 2018.

(51) Int. Cl.
| | |
|---|---|
| *H01M 10/0567* | (2010.01) |
| *B60K 7/00* | (2006.01) |
| *B60L 50/50* | (2019.01) |
| *H01M 10/0525* | (2010.01) |
| *H01M 10/0569* | (2010.01) |

(52) U.S. Cl.
CPC ....... *H01M 10/0567* (2013.01); *B60K 7/0007* (2013.01); *B60L 50/50* (2019.02); *H01M 10/0525* (2013.01); *H01M 10/0569* (2013.01); *B60K 2007/0061* (2013.01); *H01M 2220/20* (2013.01); *H01M 2300/0037* (2013.01); *H01M 2300/004* (2013.01)

(58) Field of Classification Search
CPC .... H01M 2300/0037; H01M 2300/004; B60L 11/18; B60K 7/0007; B60K 2007/0061
See application file for complete search history.

(56) References Cited

U.S. PATENT DOCUMENTS

| | | | |
|---|---|---|---|
| 7,163,768 B2 | 1/2007 | Utsugi et al. | |
| 8,940,439 B2 | 1/2015 | Kawashima et al. | |
| 9,083,059 B2 * | 7/2015 | Hayakawa | H01M 10/052 |
| 9,455,476 B2 | 9/2016 | Ihara et al. | |
| 9,912,013 B2 | 3/2018 | Hayakawa et al. | |
| 2009/0017374 A1 * | 1/2009 | Saito | H01M 10/0569 |
| | | | 429/199 |
| 2010/0035146 A1 * | 2/2010 | Fujii | H01M 10/0525 |
| | | | 429/200 |
| 2010/0178569 A1 | 7/2010 | Ihara et al. | |
| 2010/0190065 A1 | 7/2010 | Ihara et al. | |
| 2010/0209785 A1 | 8/2010 | Kawashima | |
| 2010/0216017 A1 | 8/2010 | Saito et al. | |
| 2010/0216034 A1 * | 8/2010 | Odani | H01M 10/0567 |
| | | | 429/330 |
| 2011/0059357 A1 * | 3/2011 | Okae | H01M 10/0567 |
| | | | 429/188 |
| 2012/0058401 A1 | 3/2012 | Ihara et al. | |
| 2012/0316716 A1 | 12/2012 | Odani et al. | |
| 2013/0177799 A1 | 7/2013 | Ihara et al. | |
| 2015/0079470 A1 * | 3/2015 | Kano | H01M 4/131 |
| | | | 429/217 |
| 2017/0025706 A1 | 1/2017 | Dahn et al. | |
| 2017/0309891 A1 | 10/2017 | Matsui et al. | |
| 2018/0034011 A1 | 2/2018 | Tsuda et al. | |
| 2018/0040881 A1 * | 2/2018 | Kusagawa | H01M 4/587 |

FOREIGN PATENT DOCUMENTS

| | | |
|---|---|---|
| CN | 105186032 | 12/2015 |
| EP | 3 098 882 | 11/2016 |
| JP | 2009-038018 | 2/2009 |
| JP | 2010153207 A * | 7/2010 |
| JP | 2017-157327 | 9/2017 |
| WO | WO 16/056361 | 4/2016 |
| WO | 2017026181 A1 | 2/2017 |

OTHER PUBLICATIONS

PCT International Search Report and Written Opinion issued in related PCT/CA2018/000163 mailed Dec. 17, 2018.
Aiken et al., J2014, An apparatus for the study of in situ gas evolution in li-ion pouch cells, Journal of the Electrochemical Society, 161(10):A1548-A1554.

(Continued)

*Primary Examiner* — Carlos Barcena
(74) *Attorney, Agent, or Firm* — Knobbe Martens Olson & Bear LLP

(57) ABSTRACT

Improved battery systems with two-additive mixtures including in an electrolyte solvent that is a carbonate solvent, an organic solvent, a non-aqueous solvent, methyl acetate, or a combination of them. The positive electrode of the improved battery systems may be formed from lithium nickel manganese cobalt compounds, and the negative electrode of the improved battery system may be formed from natural or artificial graphite.

23 Claims, 33 Drawing Sheets

(56) References Cited

OTHER PUBLICATIONS

Bond et al., 2013, Improving precision and accuracy in coulombic efficiency measurements of li-ion batteries, Journal of the Electrochemical Society, 160(3):A521-A527.

Burns et al., 2013, Predicting and extending the lifetime of Li-ion batteries, Journal of the Electrochemical Society, 160(9):A1451-A1456.

Downie et al., 2013, The impact of electrolyte additives determined using isothermal microcalorimetry, ECS Electrochemical Letters 2(10):A106-A109.

Downie et al., 2014, Determination of the voltage dependence of parasitic heat flow in lithium ion cells using isothermal microcalorimetry, Journal of the Electrochemical Society, 161(12):A1782-A1787.

Glazier et al., 2017, Measuring the parasitic heat flow of lithium ion pouch cells containing ec-free electrolytes, Journal of the Electrochemical Society, 164(4):A567-A573.

* cited by examiner

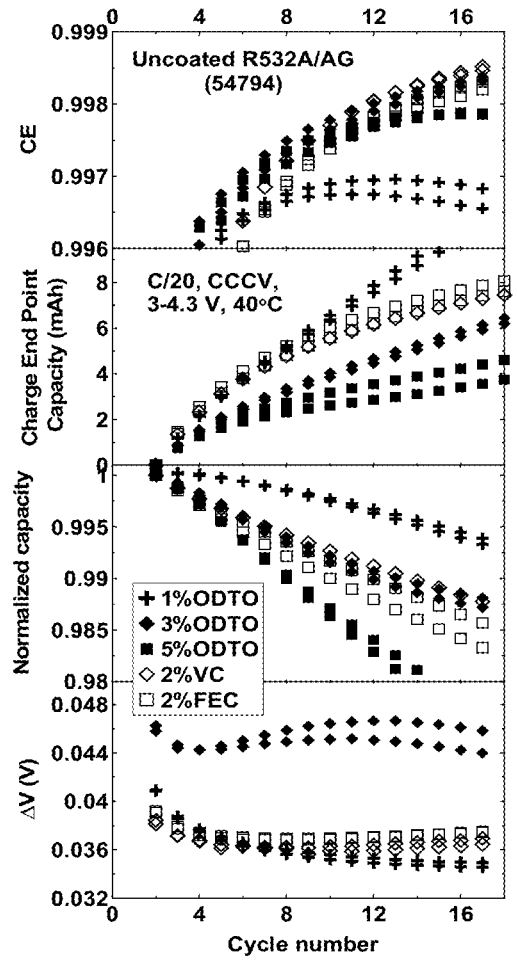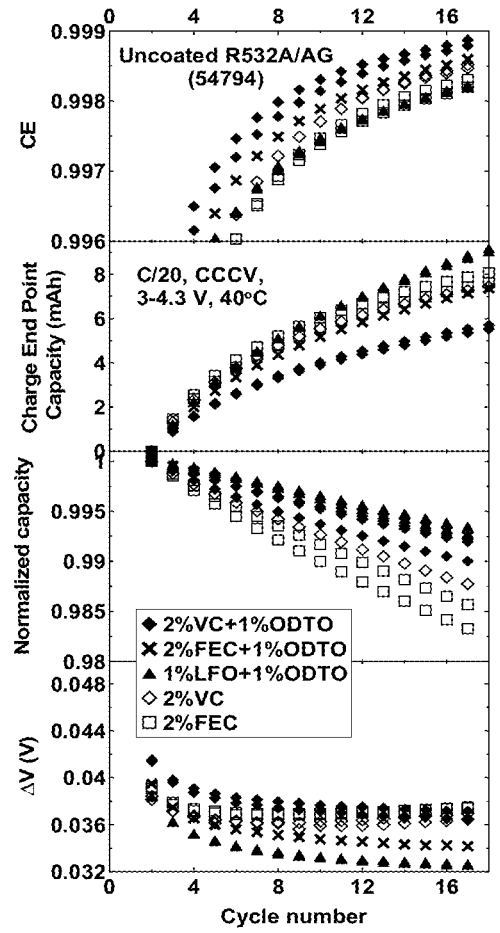
FIG. 10J
FIG. 10K

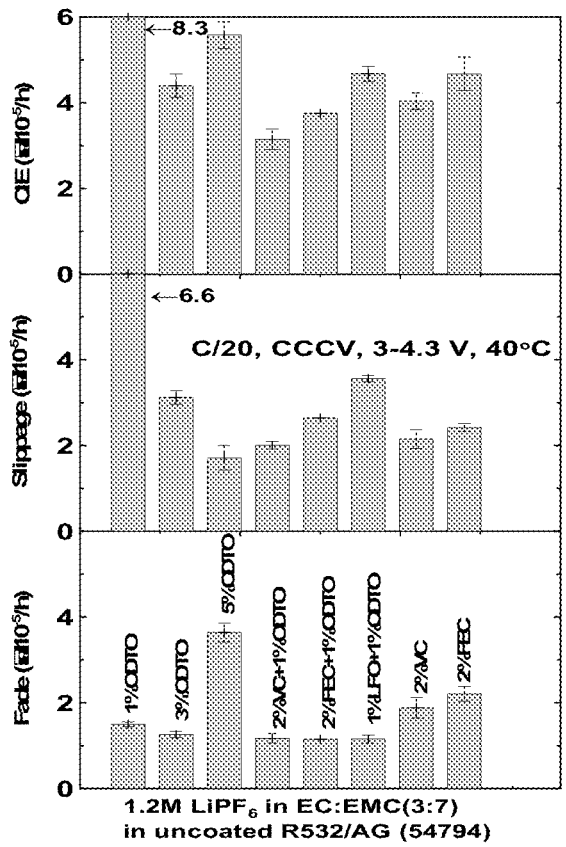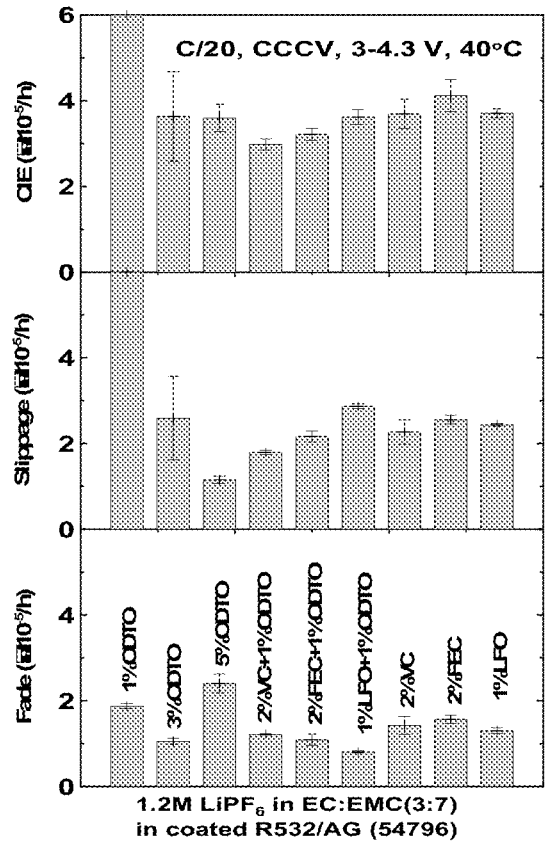
FIG. 11
FIG. 12

BATTERY SYSTEMS BASED ON TWO-ADDITIVE ELECTROLYTE SYSTEMS INCLUDING 1,2,6-OXODITHIANE-2,2,6,6-TETRAOXIDE

RELATED APPLICATION DATA

This application claims the benefit of priority of U.S. Provisional Application No. 62/641,957 filed Mar. 12, 2018. This application also claims the benefit of priority of U.S. Provisional Application No. 62/702,549 filed Jul. 24, 2018 the entirety of which is incorporated by reference herein to the extent permitted by law.

TECHNICAL FIELD

The present disclosure relates to rechargeable battery systems, and more specifically to the chemistry of such systems, including operative, electrolyte additives and electrodes, for improving the properties of the rechargeable lithium-ion-battery systems.

BACKGROUND

Rechargeable batteries are an integral component of energy-storage systems for electric vehicles and for grid storage (for example, for backup power during a power outage, as part of a microgrid, etc.). Depending on the application, the energy-storage systems require different properties. Tradeoffs in the chemistry of a battery system may need to be made to create a suitable system for a particular application. For example, in automobile applications—particularly those in an electric vehicle—the ability to charge and discharge quickly is an important property of the system. An electric vehicle owner may need to quickly accelerate in traffic, which requires the ability to quickly discharge the system. Further, fast charging and discharging places demands on the system, so the components of the system may also need to be chosen to provide sufficient lifetime under such operation conditions.

Electrolyte additives have been shown to be operative and increase the lifetime and performance of Li-ion-based batteries. For example, in J. C. Burns et al., *Journal of the Electrochemical Society*, 160, A1451 (2013), five proprietary, undisclosed electrolyte additives were shown to increase cycle life compared to an electrolyte system with no or only one additive. Other studies have focused on performance gains from electrolyte systems containing three or four additives as described in U.S. 2017/0025706. However, researchers typically do not understand the interaction between different additives that allow them to work together synergistically with the electrolyte and specific positive and negative electrodes. Thus, the composition of additive blends of certain systems is often based on trial and error and cannot be predicted beforehand.

Prior studies have not identified two-additive electrolyte systems that can be combined into a lithium-ion battery system to yield a robust system with sufficient properties for grid or automobile applications. As discussed in U.S. 2017/0025706, two-additive systems studied (for example, 2% VC+1% allyl methanesulfonate and 2% PES+1% TTSPi) typically performed worse than the three- and four-additive electrolyte systems. (See, e.g., U.S. 2017/0025706 at Tables 1 and 2.) U.S. 2017/0025706 discloses that a third compound, often tris(-trimethly-silyl)-phosphate (TTSP) or tris (-trimethyl-silyl)-phosphite (TTSPi), was necessary in concentrations of between 0.25-3 wt % to produce a robust lithium-ion-battery system. (See, e.g., U.S. 2017/0025706 at ¶72.) However, because additives can be expensive and difficult to include within Li-ion batteries on a manufacturing scale, more simple, yet effective electrolytes are needed, including those with fewer additives.

SUMMARY

This disclosure covers novel battery systems with fewer operative, electrolyte additives that may be used in different energy storage applications, for example, in vehicle and grid-storage. More specifically, this disclosure includes two-additive electrolyte systems that enhance performance and lifetime of Li-ion batteries, while reducing costs from other systems that rely on more additives. This disclosure also discloses effective positive electrodes and negative electrodes that work with the disclosed two-additive electrolyte systems to provide further systematic enhancements.

Operative additive electrolyte systems are disclosed including vinylene carbonate (VC) combined with 1,2,6-oxodithiane-2,2,6,6-tetraoxide (ODTO). ODTO has the following formula (I):

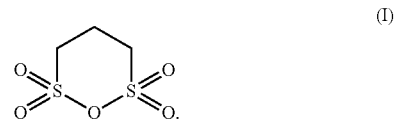

Also disclosed are fluoro ethylene carbonate (FEC) combined with ODTO and LiPO$_2$F$_2$ (called LFO here) combined with ODTO. Also disclosed are systems containing a combination of at least two of VC, LFO, and VC and ODTO.

Because VC and FEC provide similar improvements (and are believed to function similarly), a mixture of VC and FEC may be considered as only a single operative electrolyte. That is, another disclosed two-operative, additive electrolyte system includes a mixture of VC and FEC combined with ODTO. When used as part of a greater battery system (which includes the electrolyte, electrolyte solvent, positive electrode, and negative electrode), these two-operative, additive electrolyte systems produce desirable properties for energy storage applications, including in vehicle and grid applications. In addition, LFO acts effectively as a primary additive and can be combined with FEC and/or VC to make a additive system which can be further improved with LFO.

More specifically, lithium nickel manganese cobalt oxide (NMC) positive electrodes, graphite negative electrodes, a lithium salt dissolved in an organic or non-aqueous solvent, which may include methyl acetate (MA), and two additives can form a battery system with desirable properties for different applications. The electrolyte solvent may be the following solvents alone or in combination: ethylene carbonate (EC), ethyl methyl carbonate (EMC), methyl acetate, propylene carbonate, dimethyl carbonate, diethyl carbonate, another carbonate solvent (cyclic or acyclic), another organic solvent, and/or another non-aqueous solvent. Solvents are present in concentrations greater than the additives, typically greater than 6% by weight. The solvent may be combined with the disclosed two-additive pairs (such as VC with ODTO, FEC with ODTO, LFO with ODTO, a mixture of VC and FEC with ODTO, or another combination) to form a battery system with desirable properties for different applications. The positive electrode may be coated with a material such as aluminum oxide (Al$_2$O$_3$), titanium dioxide (TiO$_2$), or another coating. Further, as a cost savings, the negative electrode may be formed from natural graphite, however depending on the pricing structure, in certain instances artificial graphite is cheaper than natural graphite.

The disclosure herein is supported by experimental data that shows the symbiotic nature of the two-additive electrolyte systems and selected electrodes. Exemplary battery systems include two additives (for example, FEC, LFO or VC, ODTO, a graphite negative electrode (either naturally occurring graphite or an artificial, synthetic graphite), an NMC positive electrode, a lithium electrolyte (formed from, for example, a lithium salt such as lithium hexafluorophosphate with chemical composition $LiPF_6$), and an organic or non-aqueous solvent. in further embodiments, the first additive is a combination of at least two of VC, LFO, and FEC.

An exemplary embodiment of this application is a non-aqueous electrolyte for a lithium ion battery comprising a lithium salt, a nonaqueous solvent, and an additive mixture comprising a first operative additive selected from vinylene carbonate, $LiPO_2F_2$ (LFO), fluoroethylene carbonate, or any combination of them, and a second operative additive of 1,2,6-oxodithiane-2,2,6,6-tetraoxide having the following formula (I):

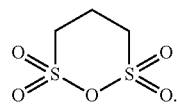

(I)

In another exemplary embodiment, a concentration of the first operative additive is in a range from 0.25 to 6% by weight.

In another exemplary embodiment, the concentration of the second operative additive is in a range from 0.25 to 5% by weight.

In another exemplary embodiment, the concentration of the first operative additive is 2% by weight (if it is VC or FEC) and 1% by weight (if it is LFO), and the concentration of the second operative additive is 1% by weight.

In another exemplary embodiment, the first operative additive is fluoroethylene carbonate.

In another exemplary embodiment, the first operative additive is vinylene carbonate.

In another exemplary embodiment, the first operative additive is $LiPO_2F_2$.

In another exemplary embodiment, the nonaqueous solvent is a carbonate solvent.

In another exemplary embodiment, the nonaqueous solvent is at least one selected from ethylene carbonate and ethyl methyl carbonate.

In another exemplary embodiment, the electrolyte further comprises a second nonaqueous solvent.

Another exemplary embodiment of this application is a lithium-ion battery comprising: a negative electrode; a positive electrode; and a nonaqueous electrolyte comprising lithium ions dissolved in a first nonaqueous solvent, and an additive mixture comprising: a first operative additive selected from fluoroethylene carbonate, $LiPO_2F_2$ and vinylene carbonate or any combination of them; a second operative additive of 1,2,6-oxodithiane-2,2,6,6-tetraoxide having the following formula (I):

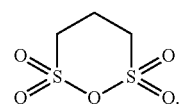

(I)

In another exemplary embodiment, a volume of gas produced in the lithium-ion battery is comparable with a volume of gas produced in a lithium-ion battery comprising only the first operative additive.

In another exemplary embodiment, the lithium-ion battery has 95% retention of initial capacity after 200 cycles between 3.0 V and 4.3 V at a charging rate of C/3 CCCV at 40° C.

In another exemplary embodiment, the lithium-ion battery has 95% retention of initial capacity after 300 cycles between 3.0 V and 4.3 V at a charging rate of C/3 CCCV at 40° C.

In another exemplary embodiment, the lithium-ion battery has 95% retention of initial capacity after 400 cycles between 3.0 V and 4.3 V at a charging rate of C/3 CCCV at 40° C.

In another exemplary embodiment, the lithium-ion battery has 95% retention of initial capacity after 500 cycles between 3.0 V and 4.3 V at a charging rate of C/3 CCCV at 40° C.

In another exemplary embodiment, the lithium-ion battery has 95% retention of initial capacity after 600 cycles between 3.0 V and 4.3 V at a charging rate of C/3 CCCV at 40° C.

In another exemplary embodiment, the lithium-ion battery has 95% retention of initial capacity after 700 cycles between 3.0 V and 4.3 V at a charging rate of C/3 CCCV at 40° C.

In another exemplary embodiment, the lithium-ion battery has 95% retention of initial capacity after 800 cycles between 3.0 V and 4.3 V at a charging rate of C/3 CCCV at 40° C.

In another exemplary embodiment, the lithium-ion battery has 95% retention of initial capacity after 900 cycles between 3.0 V and 4.3 V at a charging rate of C/3 CCCV at 40° C.

Another exemplary embodiment of this application is an electric vehicle with a rechargeable battery comprising: a drive motor; gear box; electronics; and a battery system as described herein.

BRIEF DESCRIPTION OF THE DRAWINGS

FIG. 4A illustrates the passivation impact, by showing dQ/dV vs. V during the formation cycle of uncoated NMC532/artificial graphite cells containing electrolytes having ethylene carbonate (EC):ethyl methyl carbonate (EMC) (control), and EC:EMC with 2% VC, 1% ODTO, 3% ODTO, 5% ODTO, 2% VC+1% ODTO, 2% FEC+1% ODTO, and 1% LFO ($LiPO_2F_2$)+1% ODTO.

FIG. 4B illustrates the passivation impact by showing dQ/dV vs. V during the formation cycle of coated NMC532/ artificial graphite cells containing electrolytes having ethylene carbonate (EC):ethyl methyl carbonate (EMC) (control), and EC:EMC with 2% VC, 1% ODTO, 3% ODTO, 5% ODTO, 2% VC+1% ODTO, 2% FEC+1% ODTO, and 1% LFO+1% ODTO.

Figures 4A, 4B:
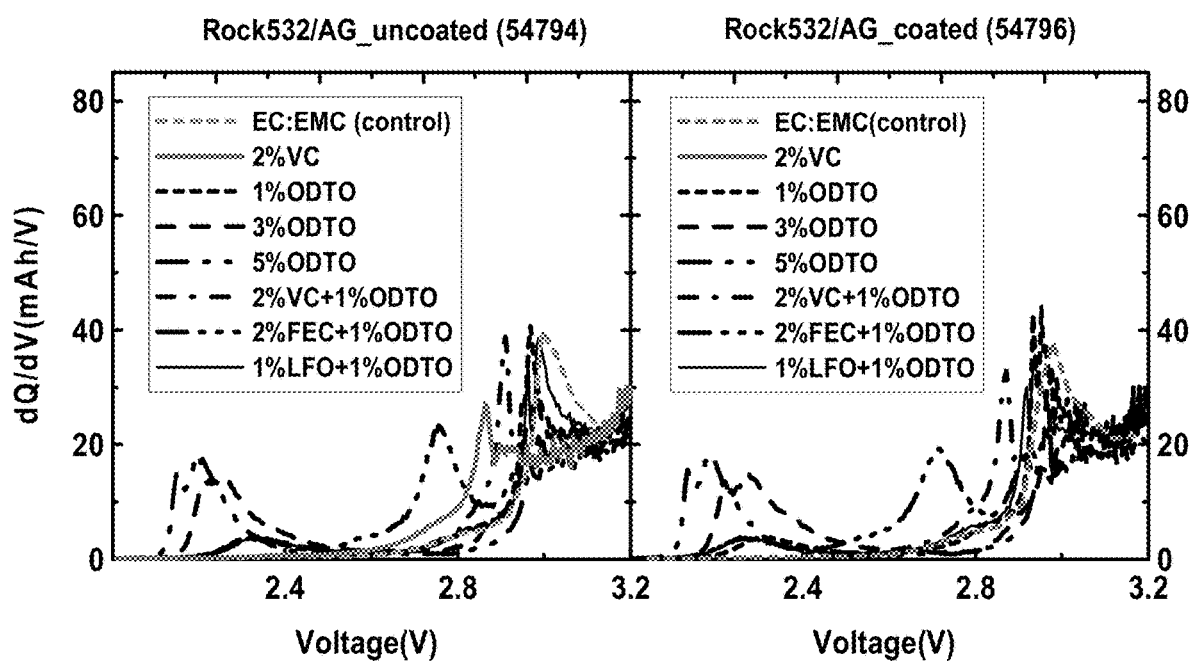
FIGS. 4A-4E illustrate the passivation impact of various electrolyte compositions in different types of cells.
Figures 4C, 4D:
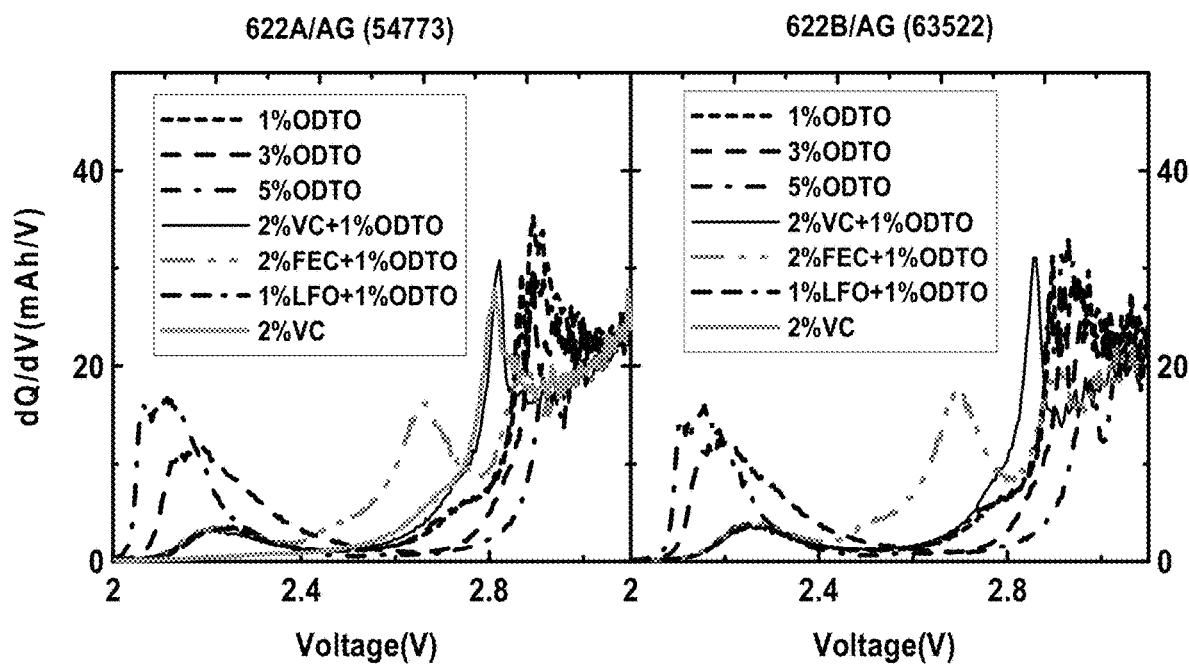

FIG. 4C illustrates the passivation impact by showing dQ/dV vs. V during the formation cycle of $Al_2O_3$-coated NMC622/artificial graphite cells containing electrolytes having 1% ODTO, 3% ODTO, 5% ODTO, 2% VC+1% ODTO, 2% FEC+1% ODTO, 1% LFO+1% ODTO, and 2% VC.

FIG. 4D illustrates the passivation impact by showing dQ/dV vs. V during the formation cycle of polycrystalline coating of aluminum, fluorine, and oxygen (AFO) coated NMC622/artificial graphite cells containing electrolytes having of ethylene carbonate (EC):ethyl methyl carbonate (EMC) (control), and EC:EMC with 1% ODTO, 3% ODTO, 5% ODTO, 2% VC+1% ODTO, 2% FEC+1% ODTO, 1% LFO+1% ODTO, and 2% VC.

Figure 4E:
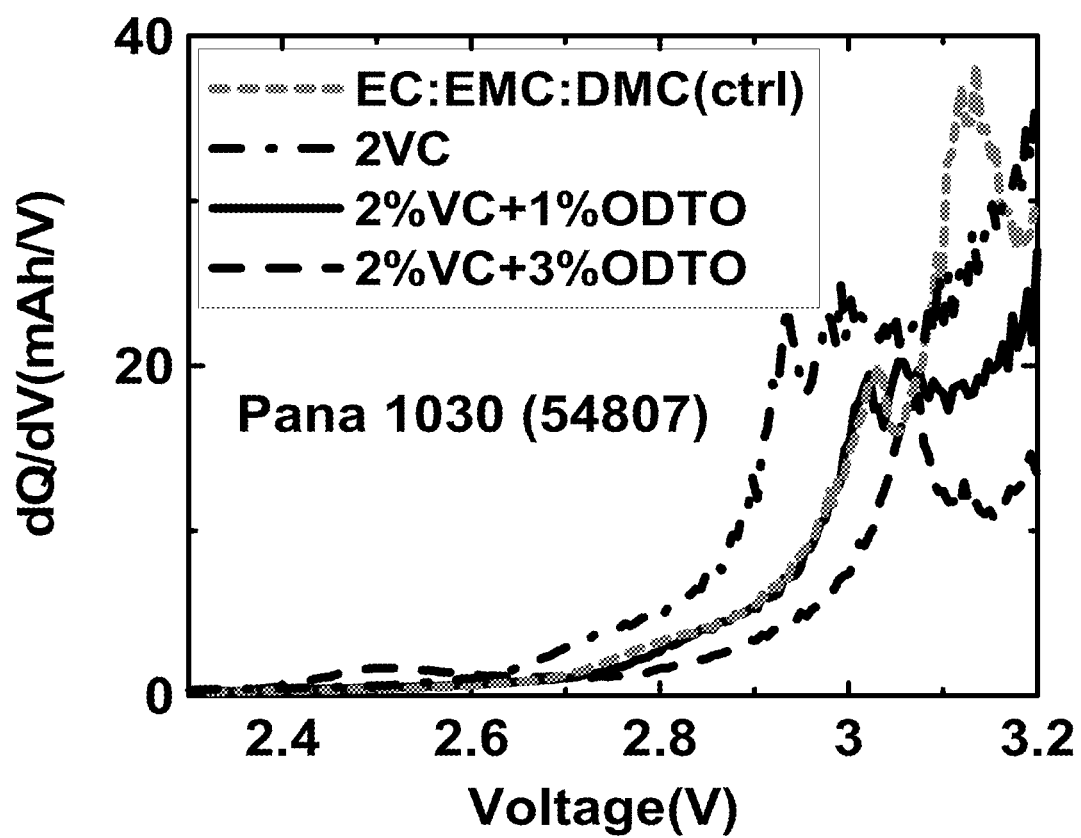

FIG. 4E illustrates the passivation impact by showing dQ/dV vs. V during the formation cycle of Panasonic 1030 cells containing electrolytes with 2% VC, 2% VC+1% ODTO, and 2% VC+3% ODTO.

FIGS. 5A-5E are the Electrochemical Impedance Spectroscopy (EIS) spectra of different types of cells with various electrolyte compositions.

Figures 5A, 5B:
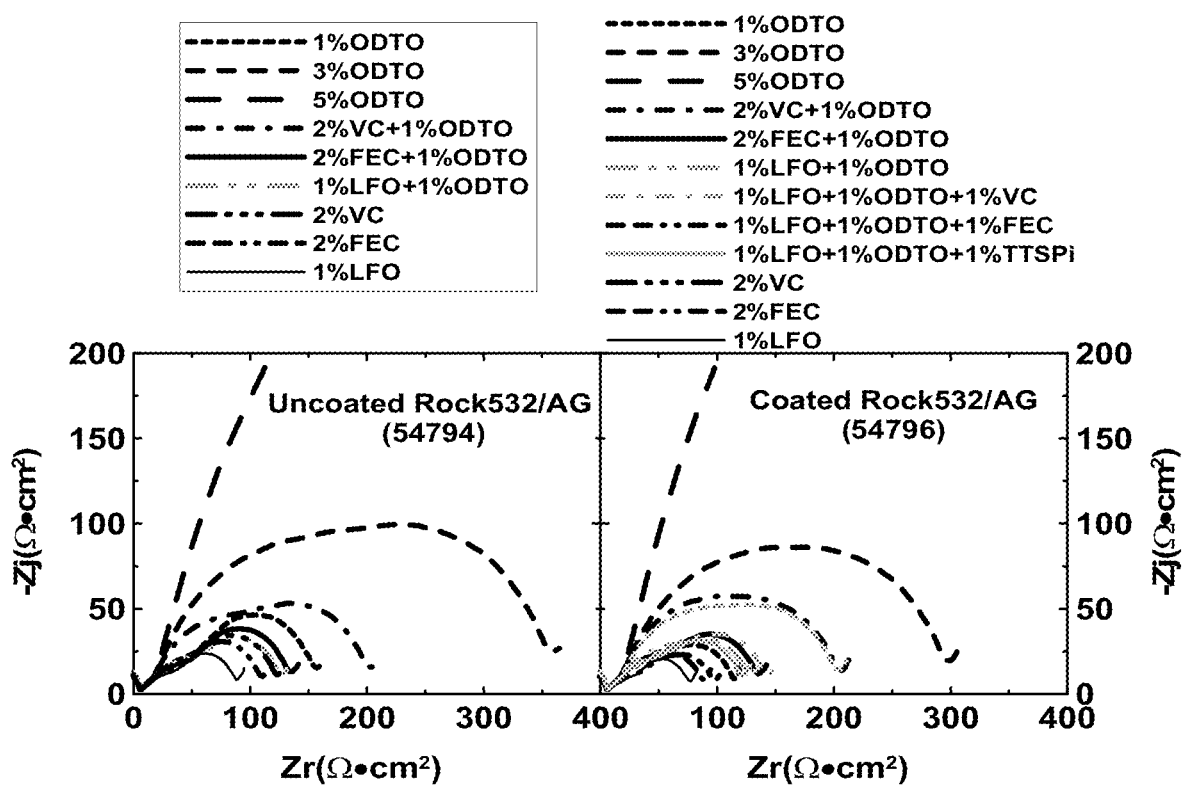

FIG. 5A is the EIS spectra of different electrolyte systems comprising 1% ODTO, 3% ODTO, 5% ODTO, 2% VC+1% ODTO, 2% FEC+1% ODTO, 1% LFO+1% ODTO, 2% VC, 2% FEC, and 1% LFO in a cell with an uncoated NMC532 positive electrode and an artificial graphite negative electrode.

FIG. 5B is the EIS spectra of different electrolyte systems comprising 1% ODTO, 3% ODTO, 5% ODTO, 2% VC+1% ODTO, 2% FEC+1% ODTO, 1% LFO+1% ODTO, 1% LFO+1% ODTO+1% VC, 1% LFO+1% ODTO+1% FEC, 1% LFO+1% ODTO+1% TTSPi, 2% VC, 2% FEC, and 1% LFO in a cell with a coated NMC532 positive electrode and an artificial graphite negative electrode.

Figures 5C, 5D:
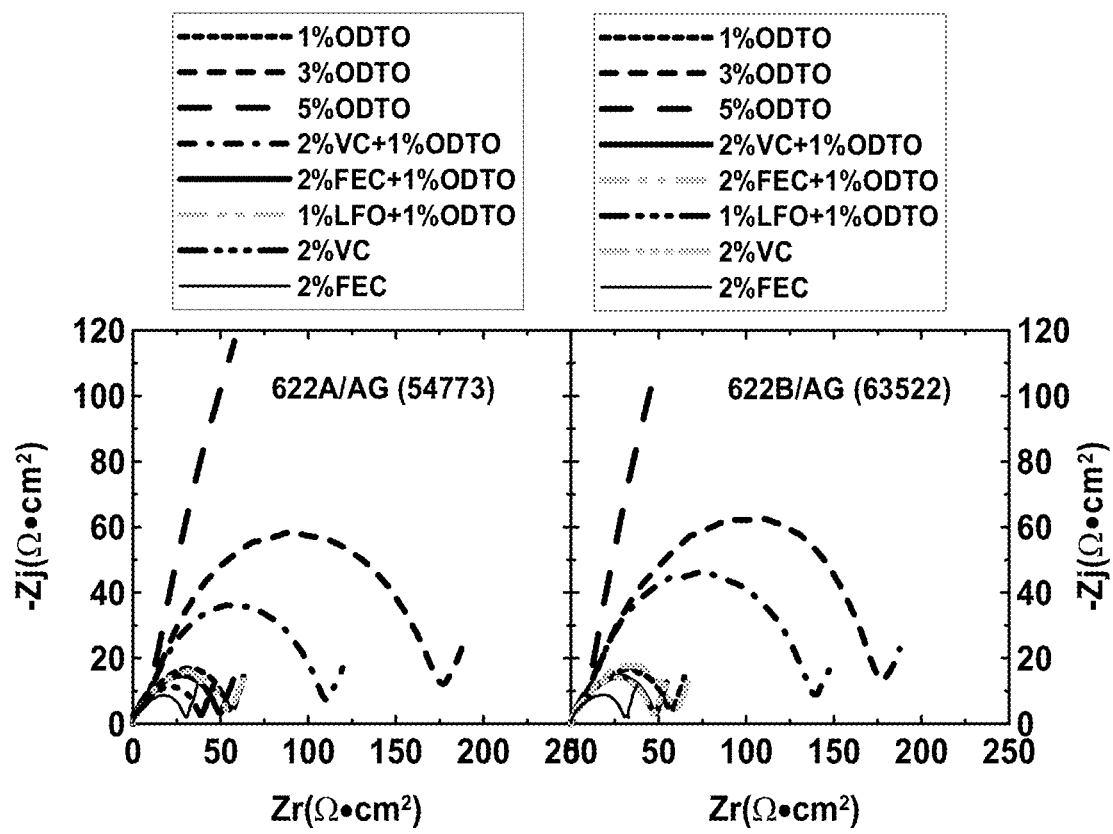

FIG. 5C is the EIS spectra of different electrolyte systems comprising 1% ODTO, 3% ODTO, 5% ODTO, 2% VC+1% ODTO, 2% FEC+1% ODTO, 1% LFO+1% ODTO, 2% VC, and 2% FEC in a cell with an $Al_2O_3$-coated NMC622 positive electrode and an artificial graphite negative electrode.

FIG. 5D is the EIS spectra of different electrolyte systems comprising 1% ODTO, 3% ODTO, 5% ODTO, 2% VC+1% ODTO, 2% FEC+1% ODTO, 1% LFO+1% ODTO, 2% VC, and 2% FEC in a cell with a AFO-coated NMC622 positive electrode and an artificial graphite negative electrode.

Figure 5E:
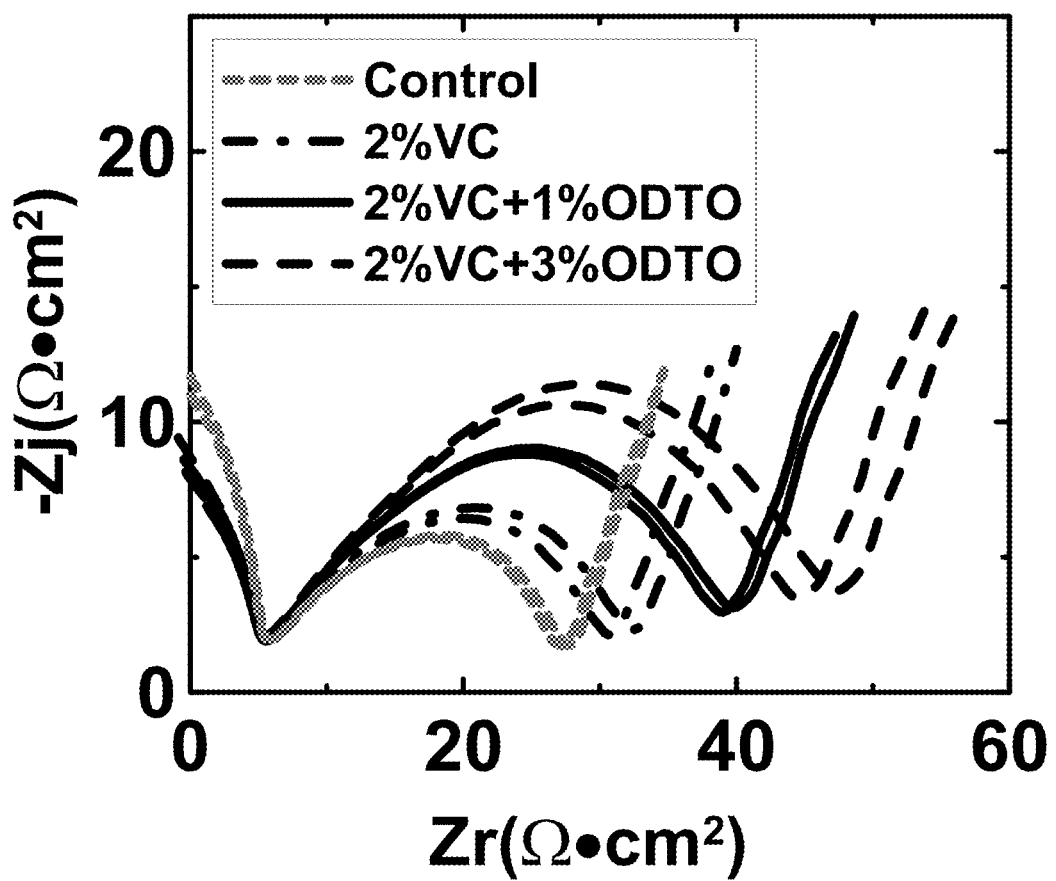

FIG. 5E is the EIS spectra of different electrolyte systems comprising 2% VC, 2% VC+1% ODTO, 2% FEC+3% ODTO in a Panasonic 1030 cell.

FIGS. 6A-6E illustrates the charge transfer resistance ($R_{ct}$) of different types of cells with various electrolyte compositions measured after the formation cycle.

Figure 6A:
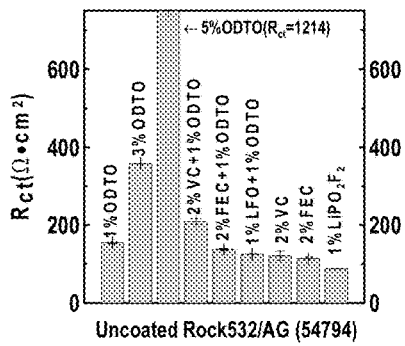

FIG. 6A illustrates the $R_{ct}$ of different electrolyte systems comprising 1% ODTO, 3% ODTO, 5% ODTO, 2% VC+1% ODTO, 2% FEC+1% ODTO, 1% LFO+1% ODTO, 2% VC, 2% FEC, and 1% LFO in a cell with an uncoated NMC532 positive electrode and an artificial graphite negative electrode.

Figure 6B:
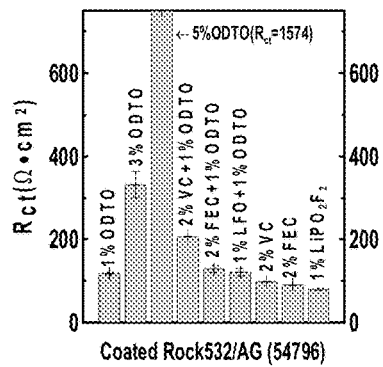

FIG. 6B illustrates the $Rt_{ct}$ of different electrolyte systems comprising 1% ODTO, 3% ODTO, 5% ODTO, 2% VC+1% ODTO, 2% FEC+1% ODTO, 1% LFO+1% ODTO, 2% VC, 2% FEC, and 1% LFO in a cell with a coated NMC532 positive electrode and an artificial graphite negative electrode.

Figure 6C:
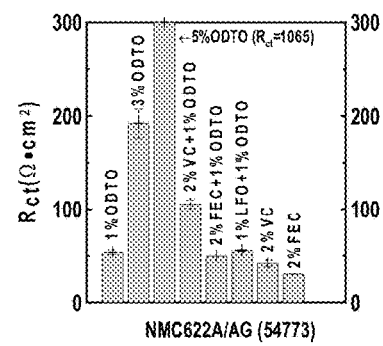

FIG. 6C illustrates the $R_{ct}$ of different electrolyte systems comprising 1% ODTO, 3% ODTO, 5% ODTO, 2% VC+1% ODTO, 2% FEC+1% ODTO, 1% LFO+1% ODTO, 2% VC, and 2% FEC in a cell with an $Al_2O_3$-coated NMC622 positive electrode and an artificial graphite negative electrode.

Figure 6D:
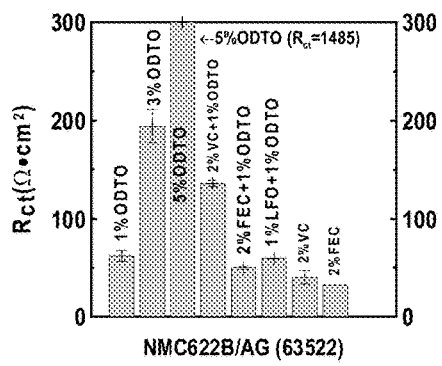

FIG. 6D illustrates the $R_{ct}$ of different electrolyte systems comprising 1% ODTO, 3% ODTO, 5% ODTO, 2% VC+1% ODTO, 2% FEC+1% ODTO, 1% LFO+1% ODTO, 2% VC, and 2% FEC in a cell with a coated NMC622 positive electrode and an artificial graphite negative electrode.

Figure 6E:
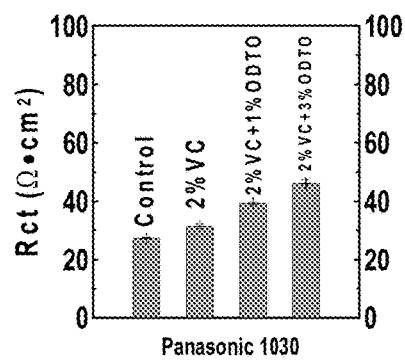

FIG. 6E illustrates the $R_{ct}$ of different electrolyte systems comprising 2% VC, 2% VC+1% ODTO, and 2% VC+3% ODTO in a Panasonic 1030 cell with a coated NMC622 positive electrode and an artificial graphite negative electrode.

FIGS. 7A-7E summarizes the experimental data of the volume of formation gas generated during cell formation for different electrolyte systems.

Figure 7A:
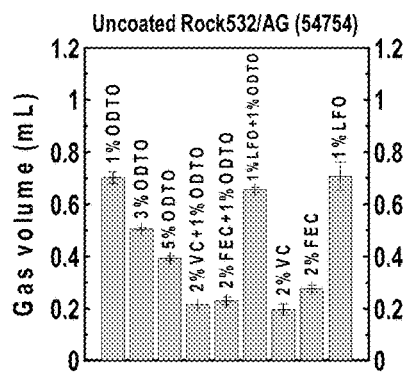

FIG. 7A is a plot that summarizes experimental data of the volume of formation gas generated during cell formation for an electrolyte system comprising 1% ODTO, 3% ODTO, 5% ODTO, 2% VC+1% ODTO, 2% FEC+1% ODTO, 1% LFO+1% ODTO, 2% VC, 2% FEC, and 1% LFO in a cell with an uncoated NMC532 positive electrode and an artificial graphite negative electrode.

Figure 7B:
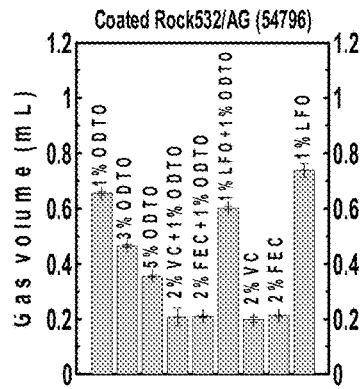

FIG. 7B is a plot that summarizes experimental data of the volume of formation gas generated during cell formation for an electrolyte system comprising 1% ODTO, 3% ODTO, 5% ODTO, 2% VC+1% ODTO, 2% FEC+1% ODTO, 1% LFO+1% ODTO, 2% VC, 2% FEC, and 1% LFO in a cell with a coated NMC532 positive electrode and an artificial graphite negative electrode.

Figure 7C:
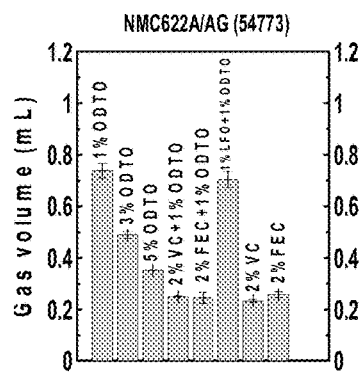

FIG. 7C is a plot that summarizes experimental data of the volume of formation gas generated during cell formation for an electrolyte system comprising 1% ODTO, 3% ODTO, 5% ODTO, 2% VC+1% ODTO, 2% FEC+1% ODTO, 1% LFO+1% ODTO, 2% VC, and 2% FEC in a cell with an $Al_2O_3$-coated NMC622 positive electrode and an artificial graphite negative electrode.

Figure 7D:
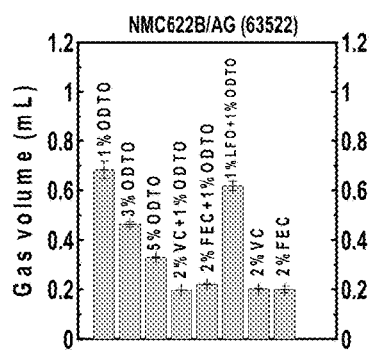

FIG. 7D is a plot that summarizes experimental data of the volume of formation gas generated during cell formation for an electrolyte system comprising 1% ODTO, 3% ODTO, 5% ODTO, 2% VC+1% ODTO, 2% FEC+1% ODTO, 1% LFO+1% ODTO, 2% VC, and 2% FEC in a cell with an AFO-coated NMC622 positive electrode and an artificial graphite negative electrode.

Figure 7E:
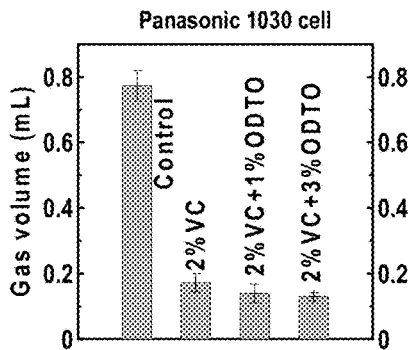

FIG. 7E is a plot that summarizes experimental data of the volume of formation gas generated during cell formation for an electrolyte system comprising 2% VC, 2% VC+1% ODTO, and 2% VC+3% ODTO in a Panasonic 1030 cell.

Figures 8A, 8B:
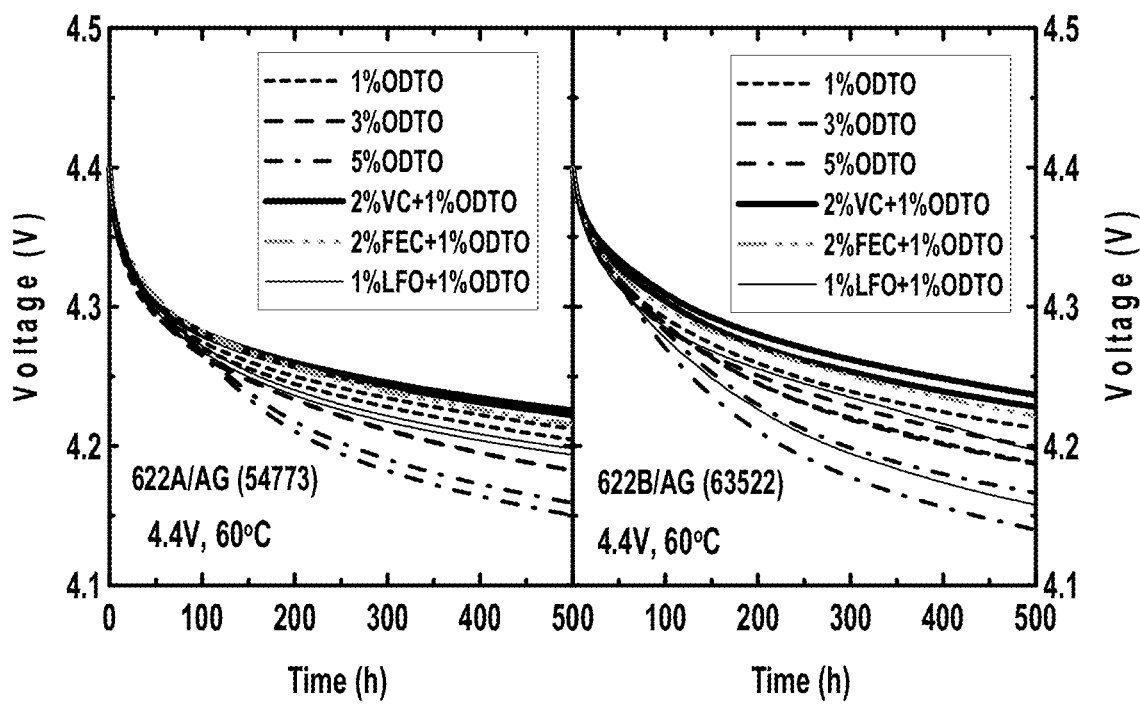

FIGS. 8A-8B illustrate the voltage versus time during high temperature storage for different NMC622/artificial graphite cells with various electrolyte systems.

FIG. 8A illustrates the voltage versus time during high temperature storage of electrolyte systems comprising 1% ODTO, 3% ODTO, 5% ODTO, 2% VC+1% ODTO, 2% FEC+1% ODTO, and 1% LFO+1% ODTO in a cell with an $Al_2O_3$-coated NMC622 positive electrode and an artificial graphite negative electrode.

FIG. 8B illustrates the voltage versus time during high temperature storage of electrolyte systems comprising 1% ODTO, 3% ODTO, 5% ODTO, 2% VC+1% ODTO, 2%

FEC+1% ODTO, and 1% LFO+1% ODTO in a cell with a coated NMC622 positive electrode and an artificial graphite negative electrode.

Figure 9:
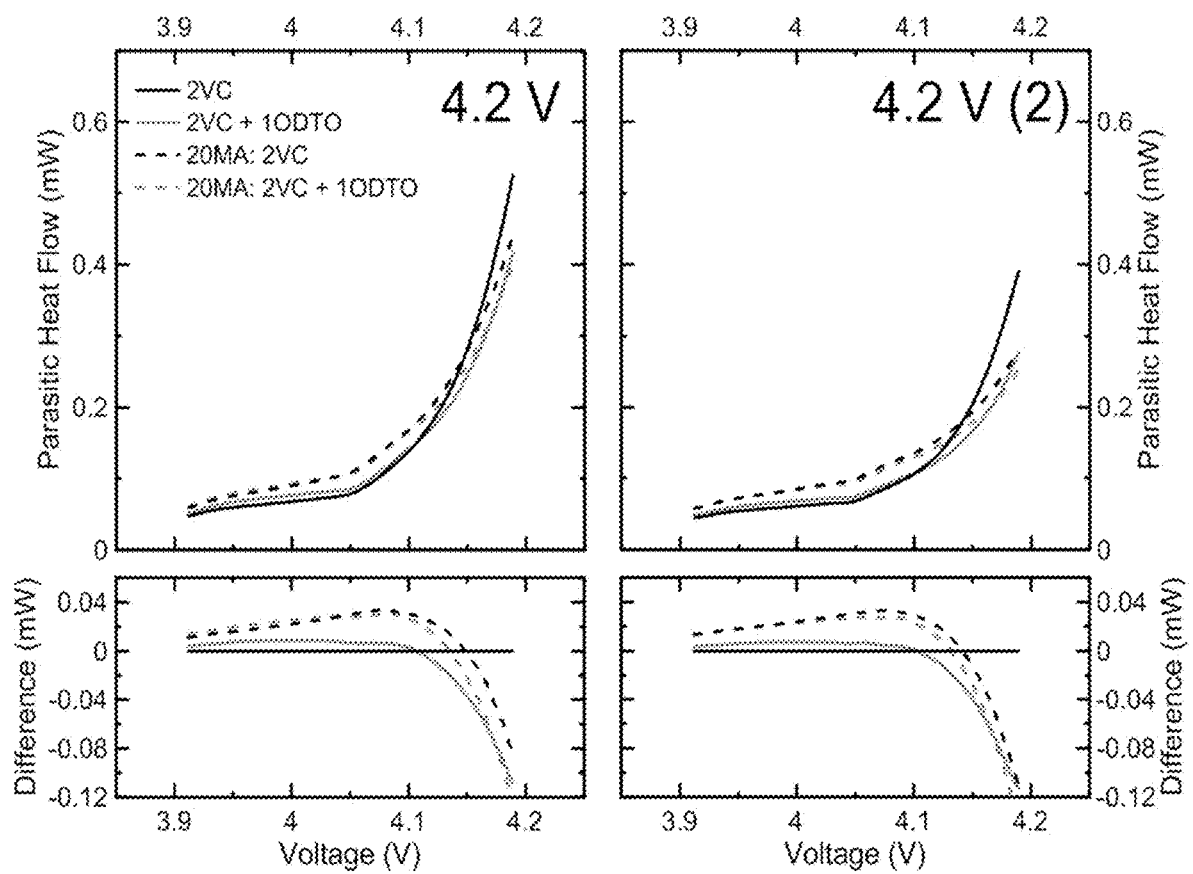

FIG. 9 illustrates the parasitic heat flow in experiments involving various electrolyte additive systems in a Panasonic 1030 cell.

Figure 10A:
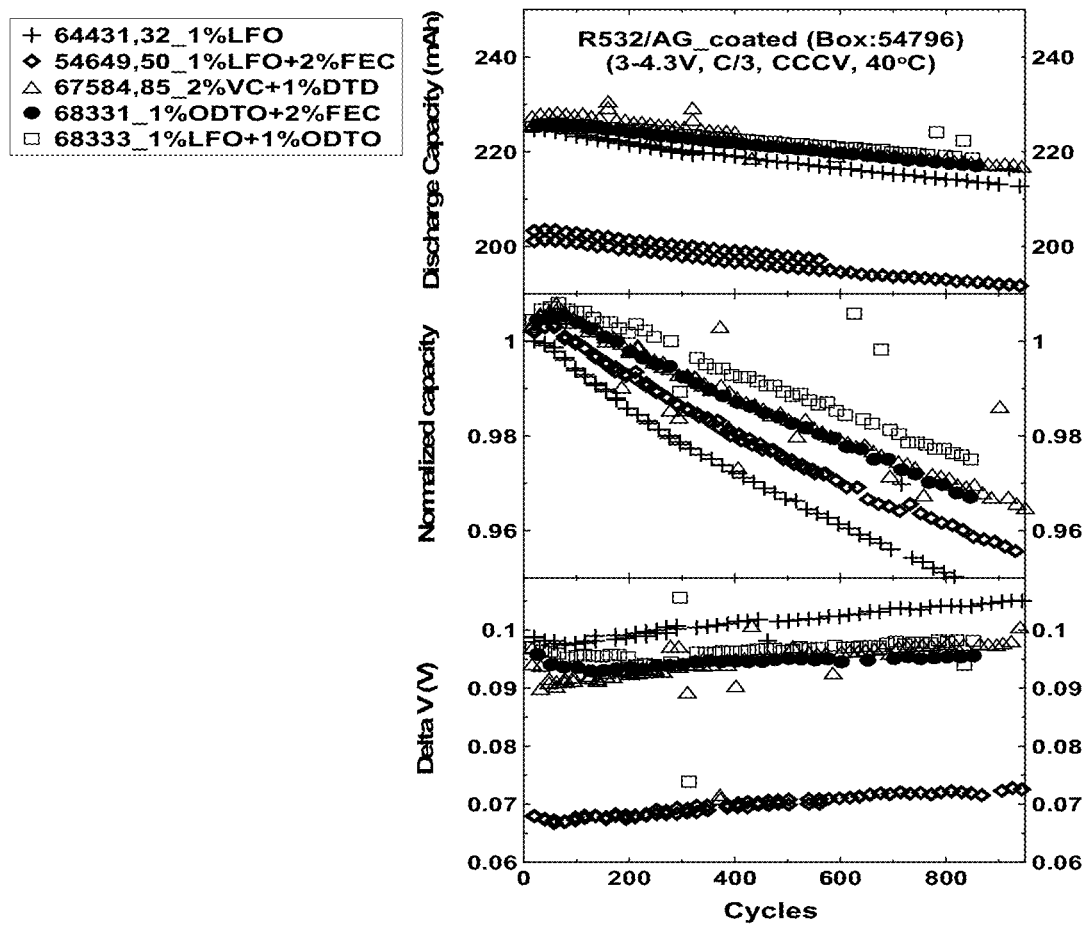
Figure 10B:
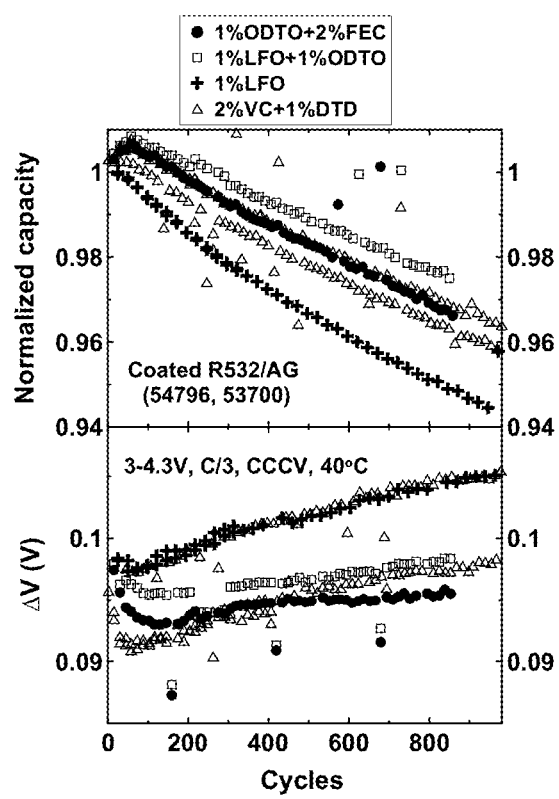
Figure 10C:
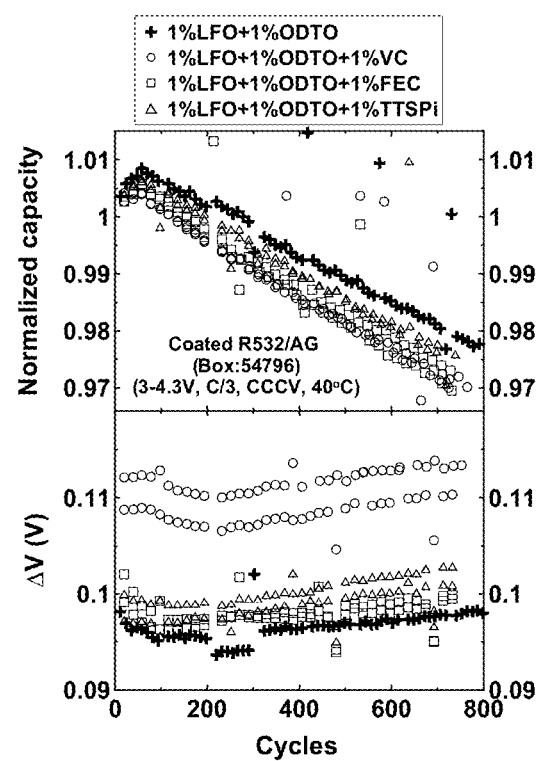
Figure 10D:
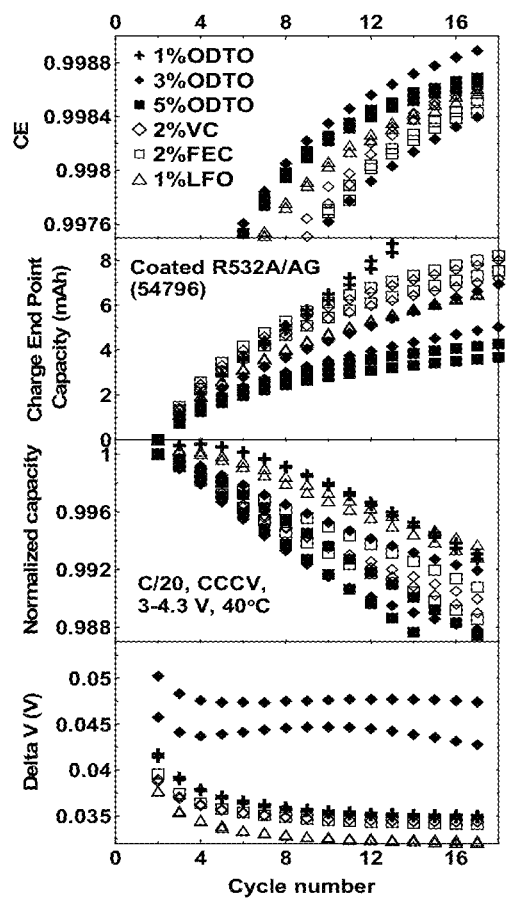
Figure 10E:
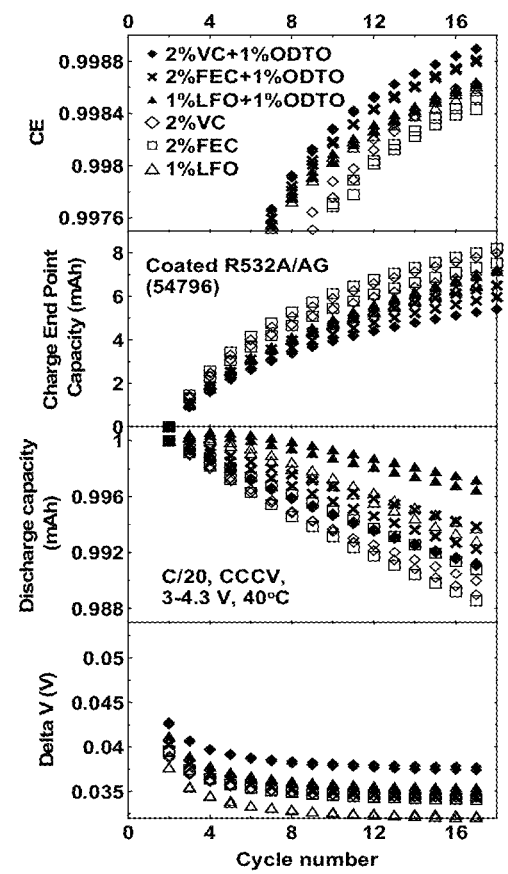
Figure 10F:
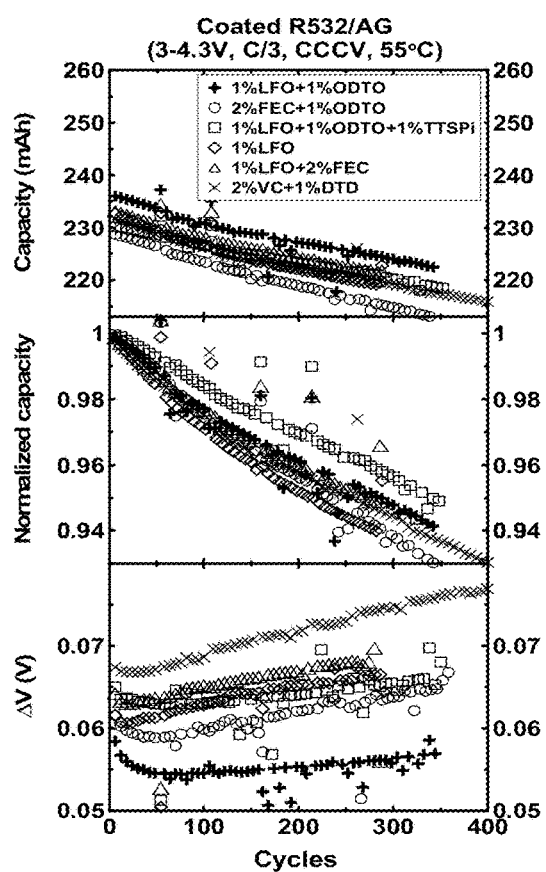
Figure 10G:
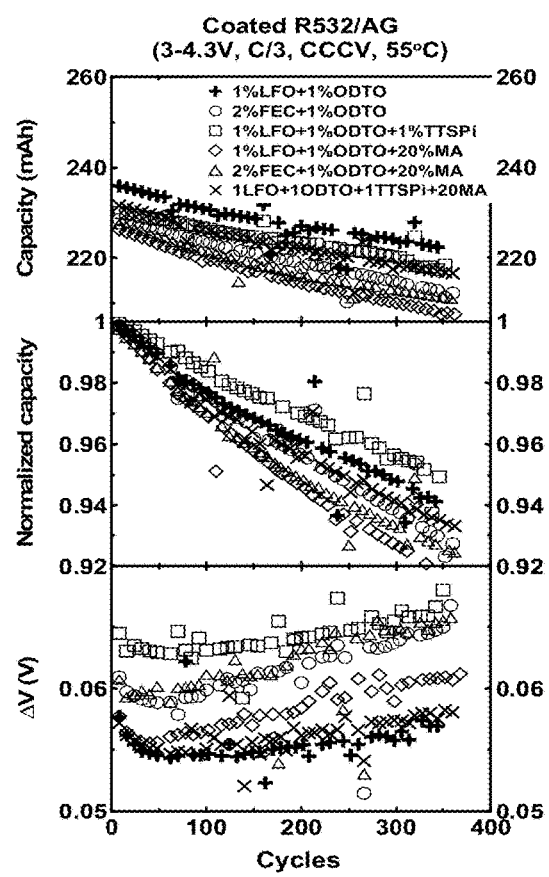
Figure 10H:
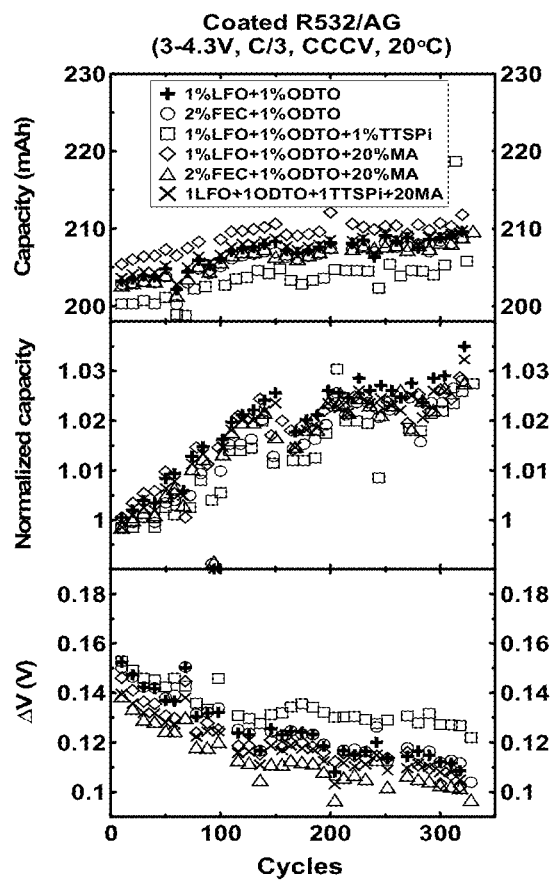
Figure 10I:
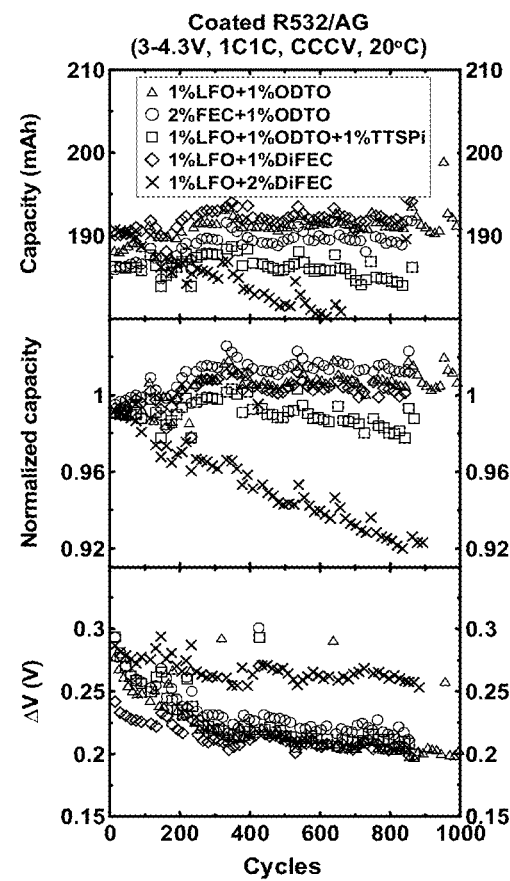
Figures 10L, 10M:
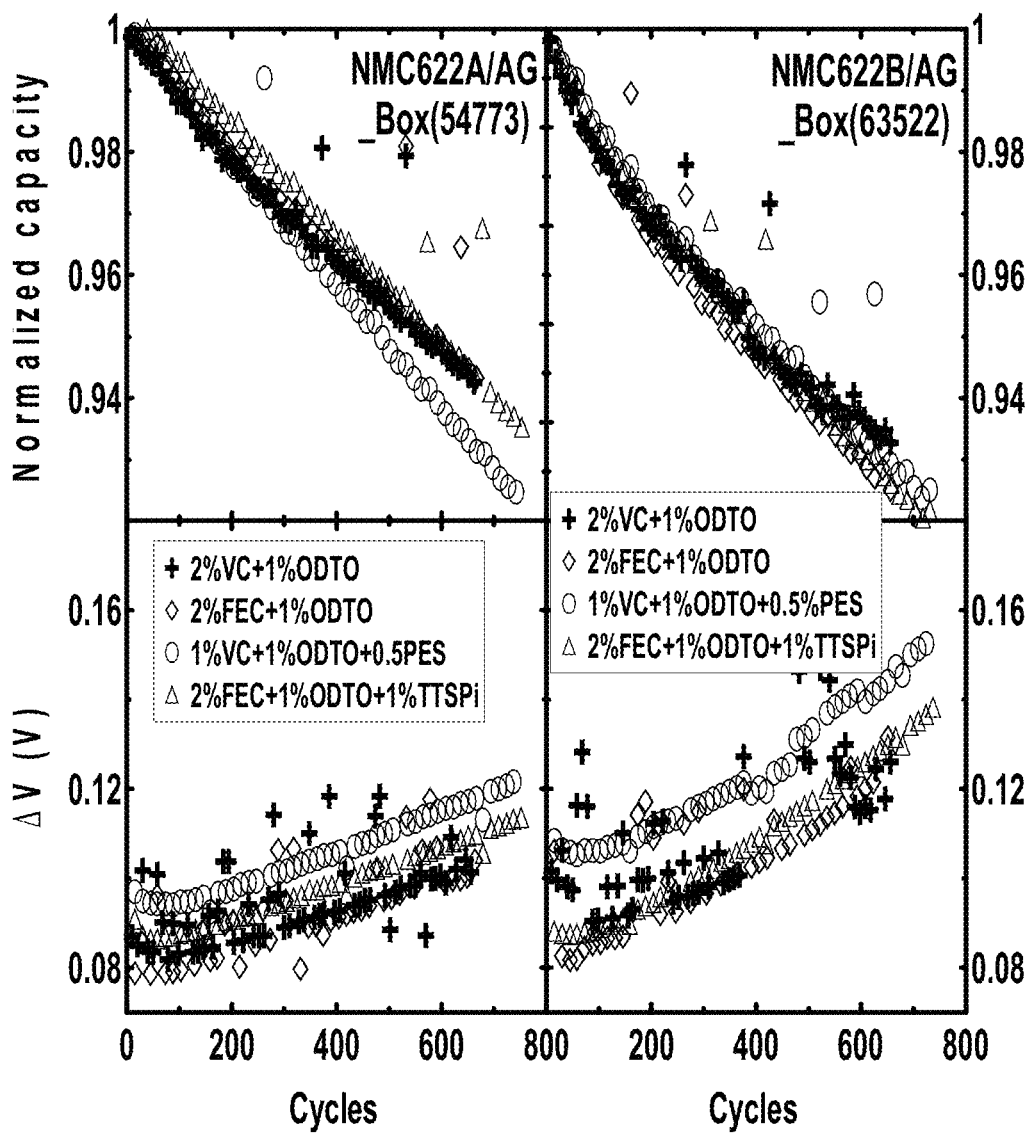
Figure 10N:
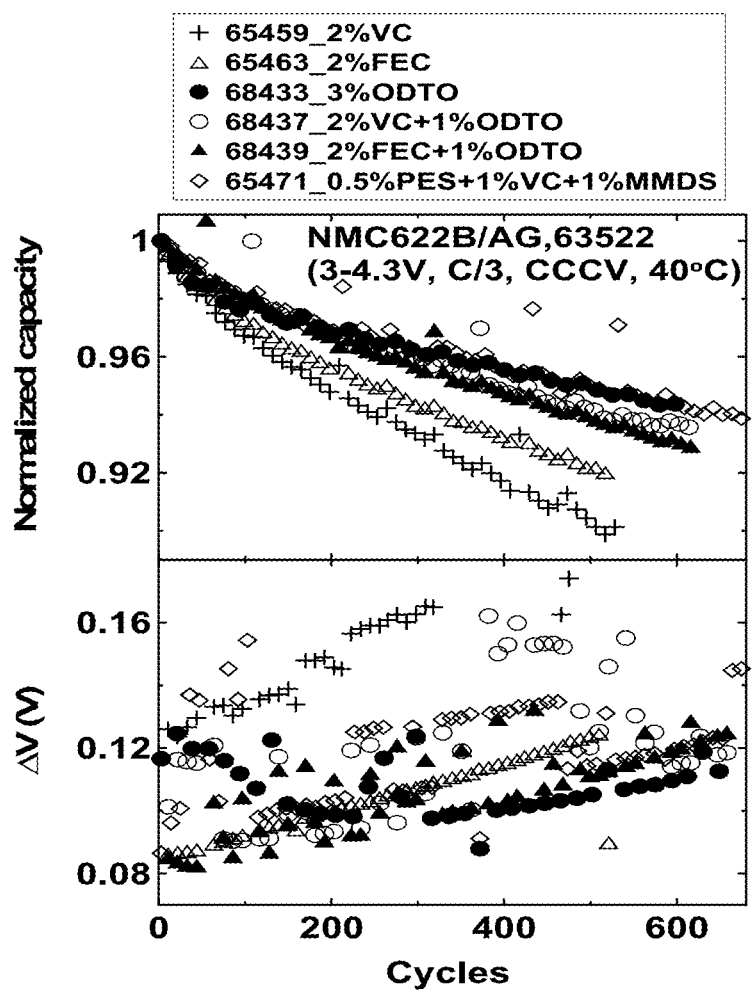
Figure 10O:
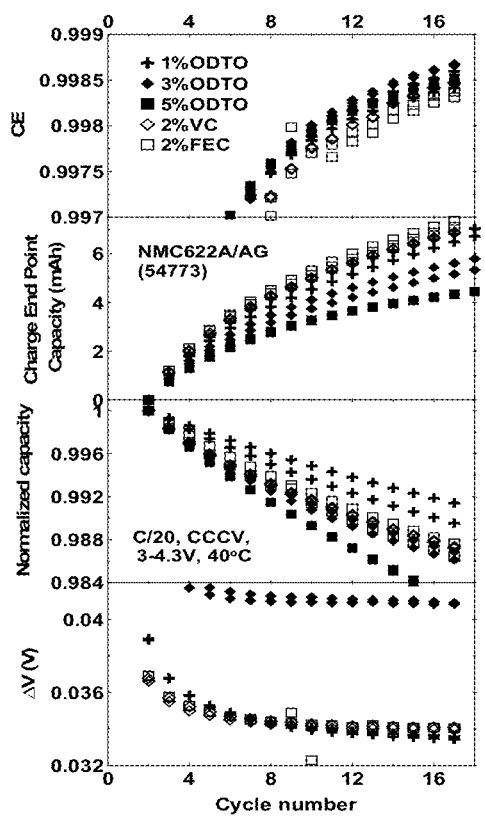
Figure 10P:
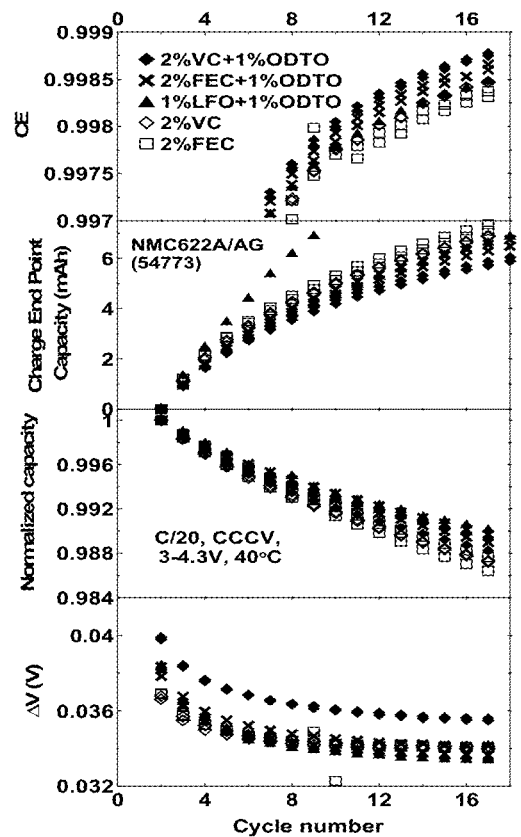
Figure 10Q:
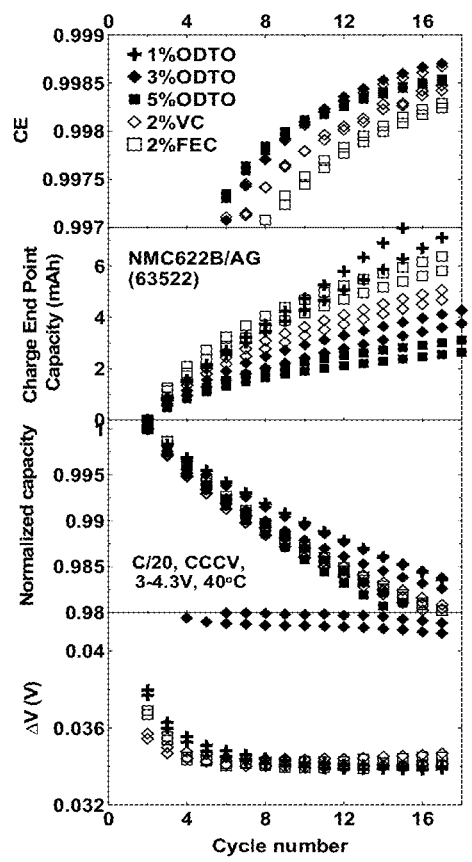
Figure 10R:
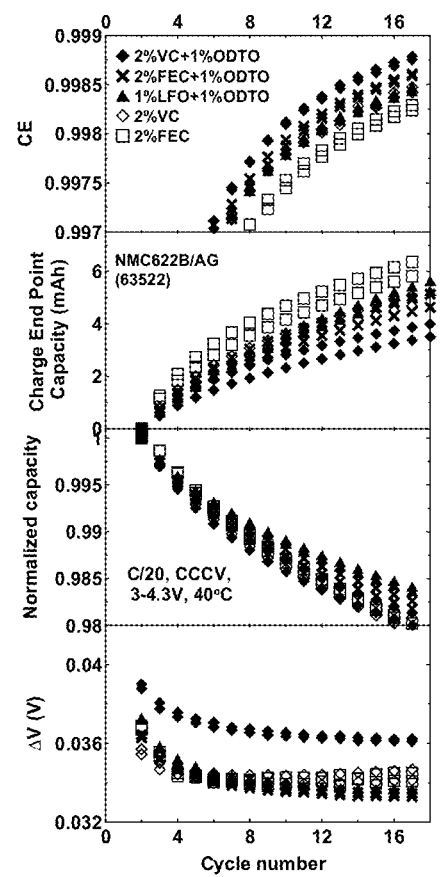
Figure 10S:
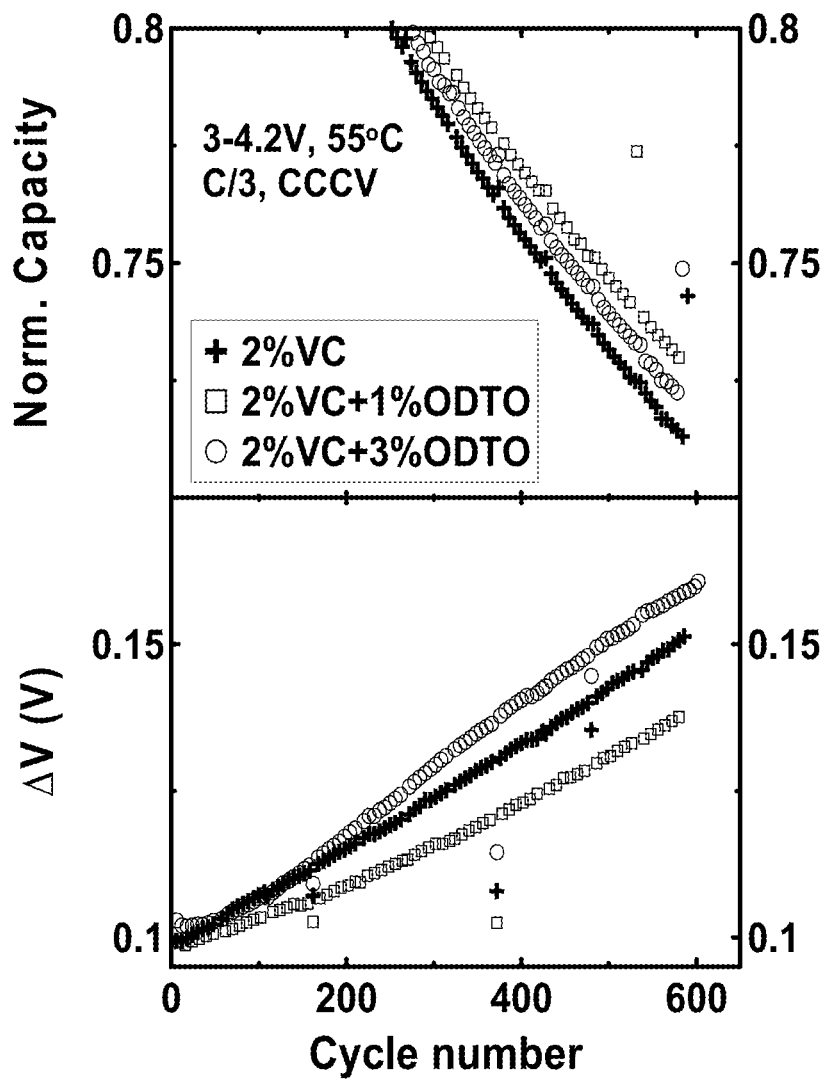
Figure 10T:
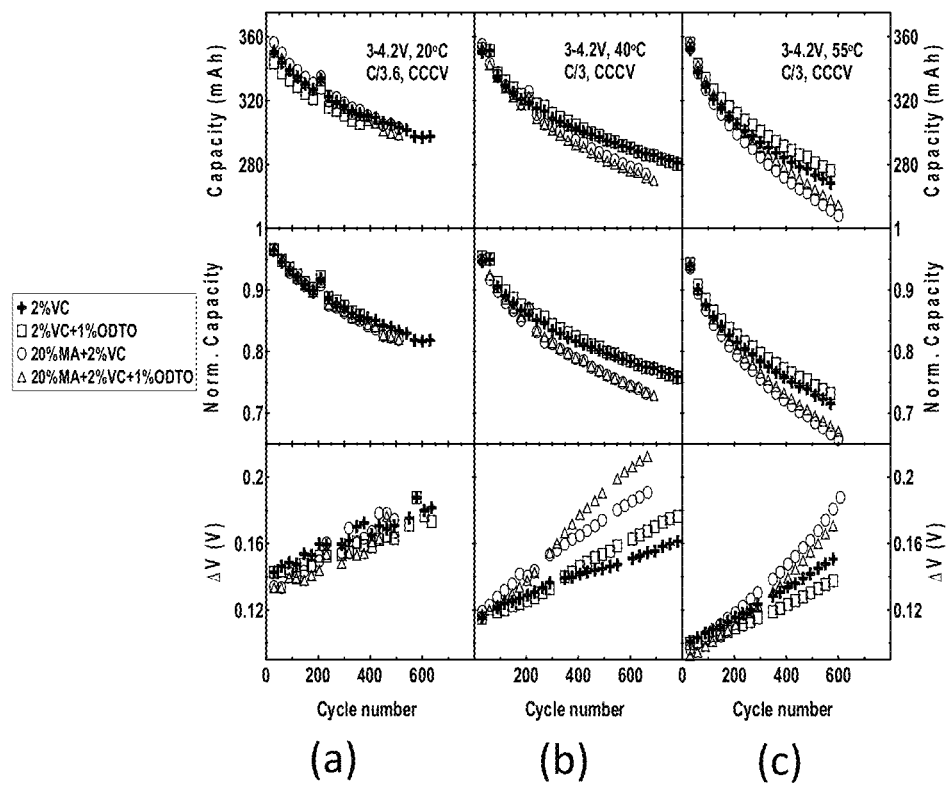
Figure 10U:
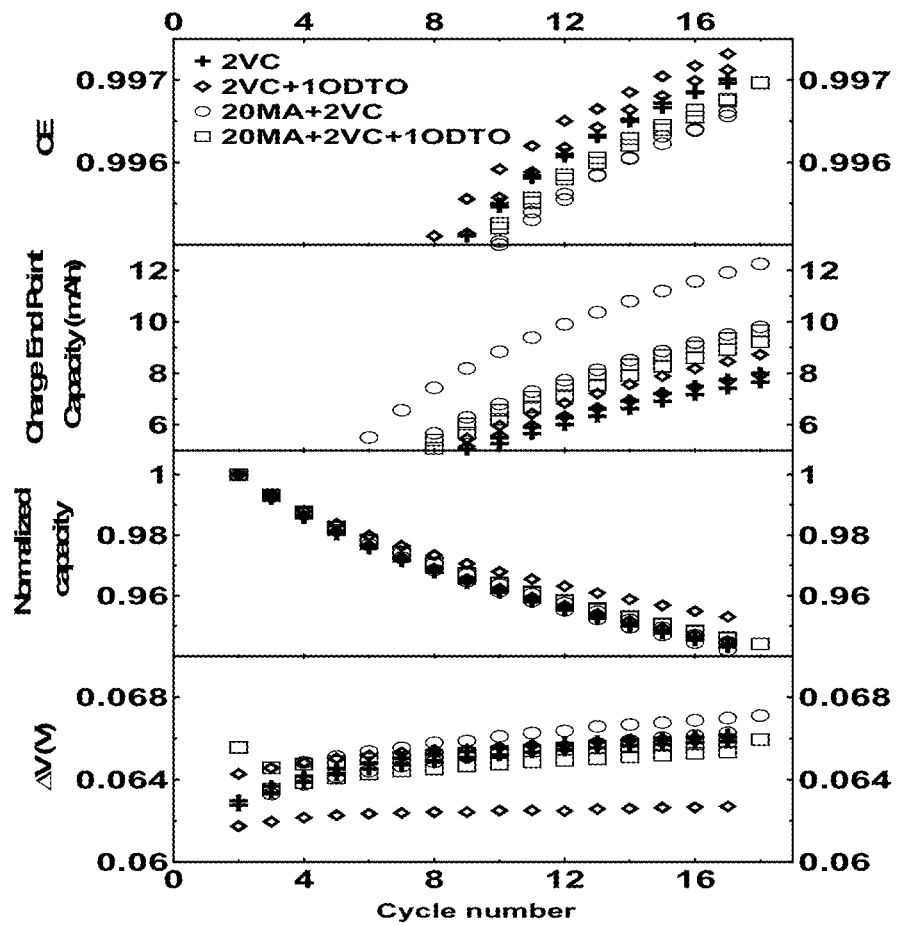
Figure 10V:
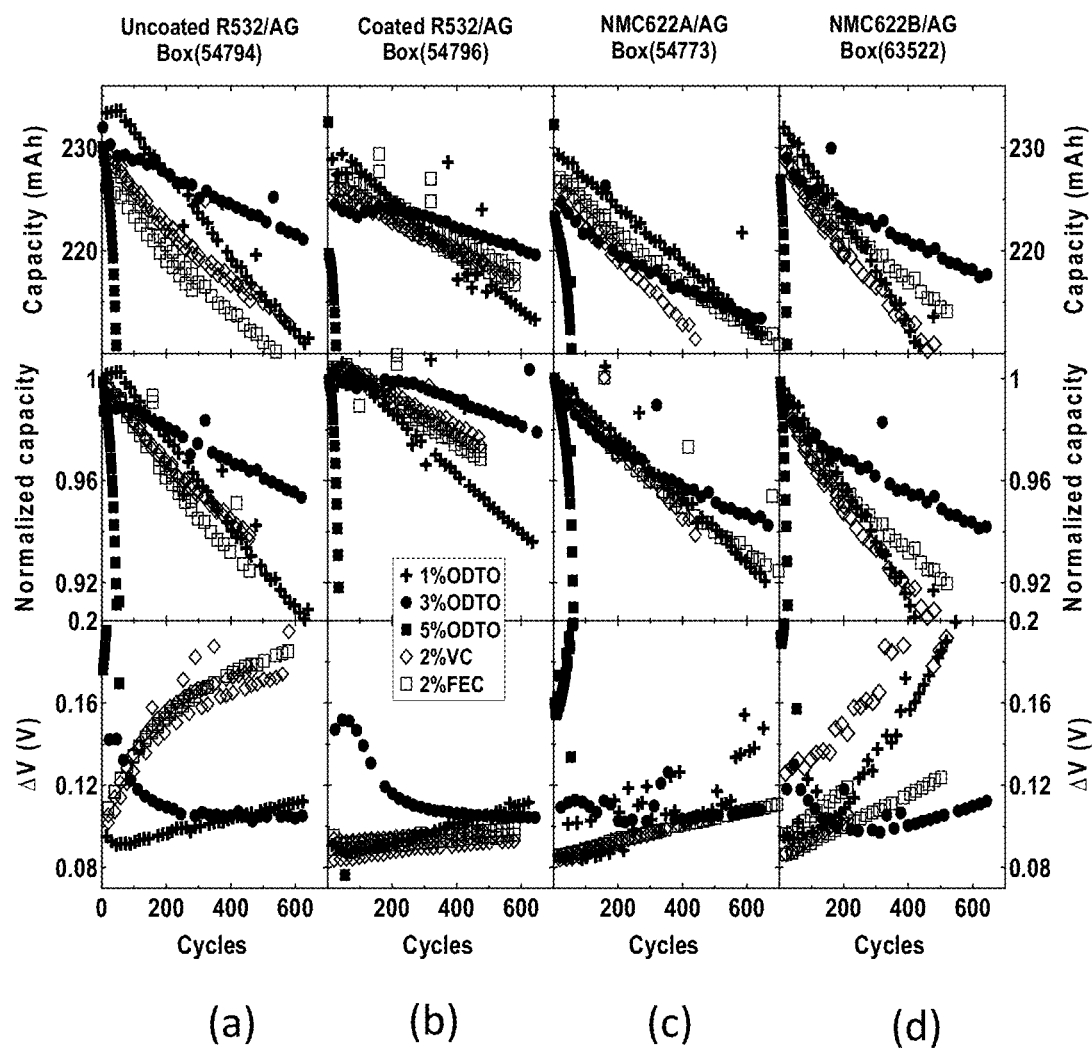
Figure 10W:
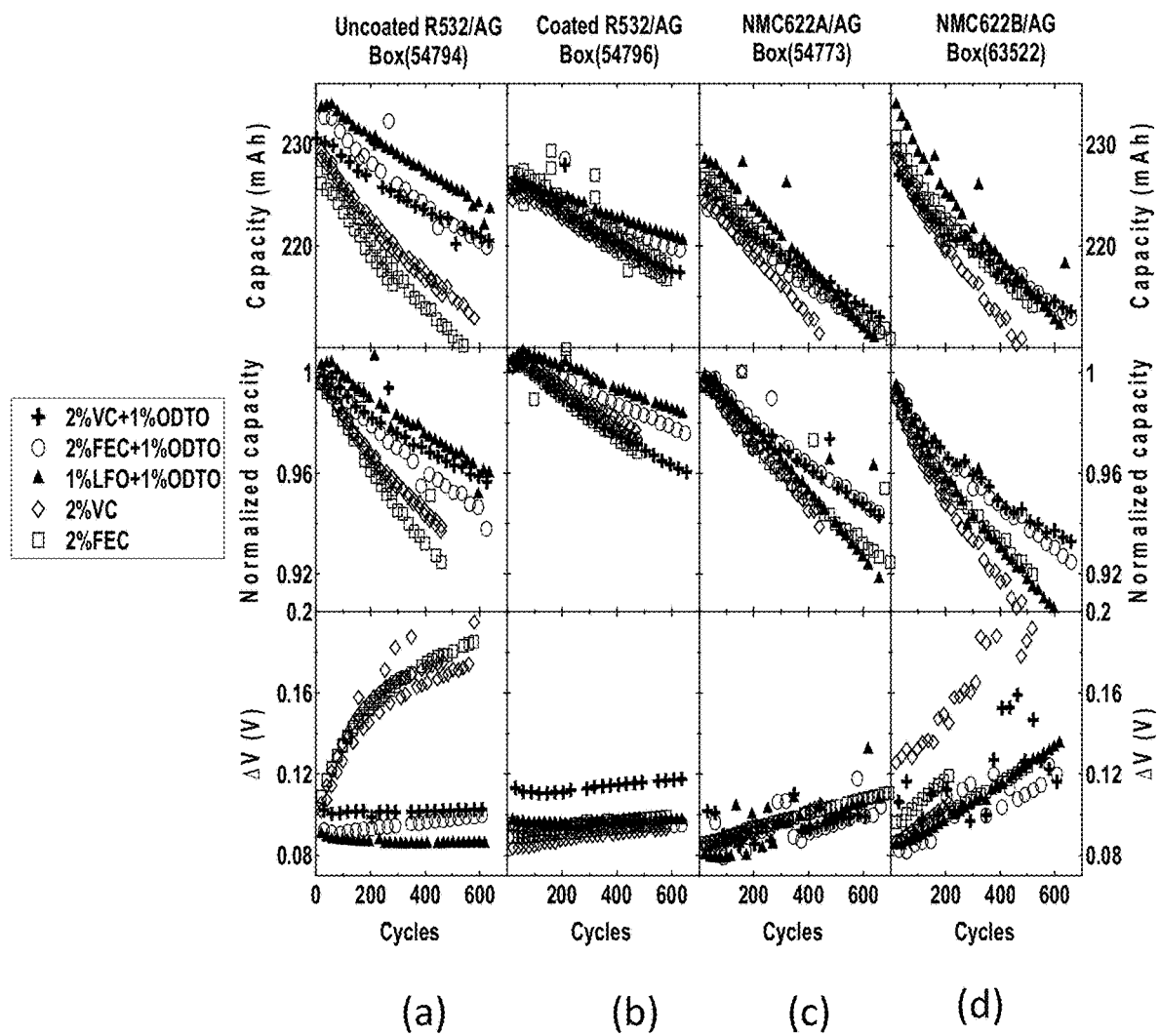

FIGS. 10A-10W illustrate experimental data collected during cycling experiments for various electrolyte systems, including discharge capacity, normalized discharge capacity (or fade rate), charge end point capacity, coulombic efficiency, and ΔV (difference between the average charge voltage and average discharge voltage).

FIGS. 10A-10I illustrate experimental data collected during cycling experiments for various additive electrolyte systems, including discharge capacity, normalized discharge capacity (or fade rate), charge end point capacity, coulombic efficiency, and ΔV (difference between the average charge voltage and average discharge voltage) using a coated NMC532 positive electrode and an artificial graphite negative electrode.

FIGS. 10J-10K illustrate experimental data collected during cycling experiments and ultra precision cycling experiments for various electrolyte systems, including discharge capacity, normalized discharge capacity (or fade rate), charge end point capacity, coulombic efficiency, and ΔV (difference between the average charge voltage and average discharge voltage) using uncoated NMC532 positive electrode and an artificial graphite negative electrode.

FIGS. 10L-10R illustrate experimental data collected during cycling experiments for various electrolyte systems, including discharge capacity, normalized discharge capacity (or fade rate), charge end point capacity, coulombic efficiency, and ΔV (difference between the average charge voltage and average discharge voltage) using $Al_2O_3$-coated and AFO-coated NMC622 positive electrode and an artificial graphite negative electrode.

FIG. 10S illustrates experimental data collected during cycling experiments for various electrolyte systems, including discharge capacity, normalized discharge capacity (or fade rate) and ΔV (difference between the average charge voltage and average discharge voltage) using Panasonic 1030 cells.

FIG. 10T illustrates experimental data collected during cycling experiments for various electrolyte systems, including discharge capacity, normalized discharge capacity (or fade rate) and ΔV (difference between the average charge voltage and average discharge voltage) using Panasonic 1030 cells.

FIG. 10U illustrates experimental data collected during cycling experiments for various electrolyte systems, including discharge capacity, normalized discharge capacity (or fade rate), charge end point capacity, coulombic efficiency, and ΔV (difference between the average charge voltage and average discharge voltage) using Panasonic 1030 cells.

FIG. 10V illustrates experimental data collected during cycling experiments for various electrolyte systems, including discharge capacity, normalized discharge capacity (or fade rate) and ΔV (difference between the average charge voltage and average discharge voltage) using coated and uncoated NMC532 positive electrode and an artificial graphite negative electrode, and $Al_2O_3$-coated and AFO-coated NMC622 positive electrode and an artificial graphite negative electrode.

FIG. 10W illustrates experimental data collected during cycling experiments for various electrolyte systems, including discharge capacity, normalized discharge capacity (or fade rate) and ΔV (difference between the average charge voltage and average discharge voltage) using coated and uncoated NMC532 positive electrode and an artificial graphite negative electrode, and $Al_2O_3$-coated and AFO-coated NMC622 positive electrode and an artificial graphite negative electrode.

FIG. 11 illustrates coulombic inefficiency per hour versus cycle number, fractional charge endpoint capacity slippage per hour versus cycle number, and fractional capacity fade per hour versus cycle number for electrolyte systems including 1% ODTO, 3% ODTO, 5% ODTO, 2% VC+1% ODTO, 2% FEC+1% ODTO, 1% LFO+1% ODTO, 2% VC, and 2% FEC cycling between 3.0 V and 4.3 V, and using uncoated NMC532 positive electrode and an artificial graphite negative electrode.

FIG. 12 illustrates coulombic inefficiency per hour versus cycle number, fractional charge endpoint capacity slippage per hour versus cycle number, and fractional capacity fade per hour versus cycle number for electrolyte systems including 1% ODTO, 3% ODTO, 5% ODTO, 2% VC+1% ODTO, 2% FEC+1% ODTO, 1% LFO+1% ODTO, 2% VC, 2% FEC, and 1% LFO cycling between 3.0 V and 4.3 V, and using coated NMC532 positive electrode and an artificial graphite negative electrode.

Figure 13:
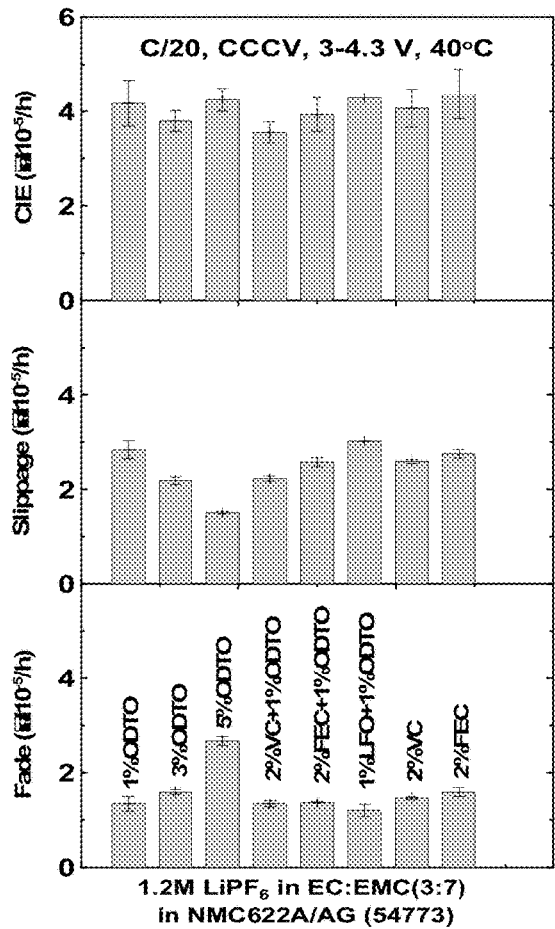

FIG. 13 illustrates coulombic inefficiency per hour versus cycle number, fractional charge endpoint capacity slippage per hour versus cycle number, and fractional capacity fade per hour versus cycle number for electrolyte systems including 1% ODTO, 3% ODTO, 5% ODTO, 2% VC+1% ODTO, 2% FEC+1% ODTO, 1% LFO+1% ODTO, 2% VC, and 2% FEC cycling between 3.0 V and 4.3 V, and using $Al_2O_3$-coated NMC622A positive electrode and an artificial graphite negative electrode.

Figure 14:
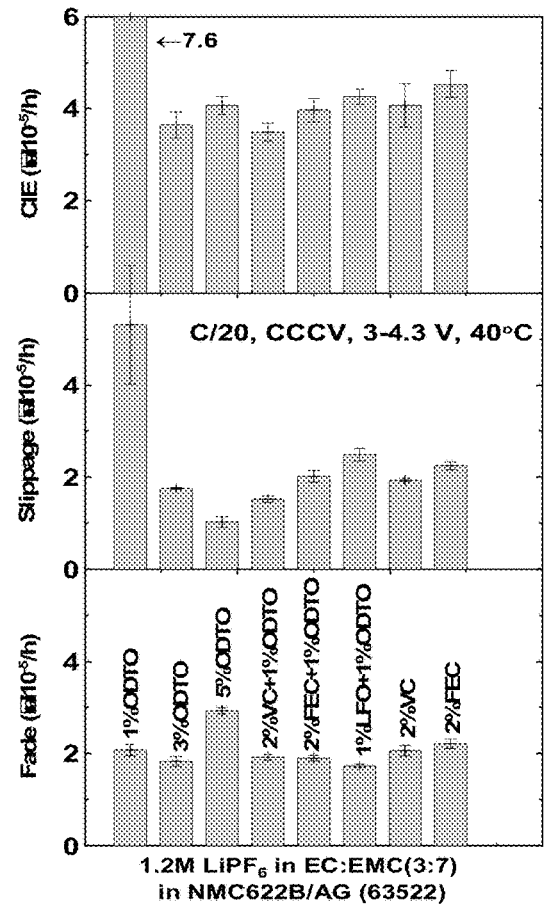

FIG. 14 illustrates coulombic inefficiency per hour versus cycle number, fractional charge endpoint capacity slippage per hour versus cycle number, and fractional capacity fade per hour versus cycle number for electrolyte systems including 1% ODTO, 3% ODTO, 5% ODTO, 2% VC+1% ODTO, 2% FEC+1% ODTO, 1% LFO+1% ODTO, 2% VC, and 2% FEC cycling between 3.0 V and 4.3 V, and using AFO-coated NMC622B positive electrode and an artificial graphite negative electrode.

Figure 15:
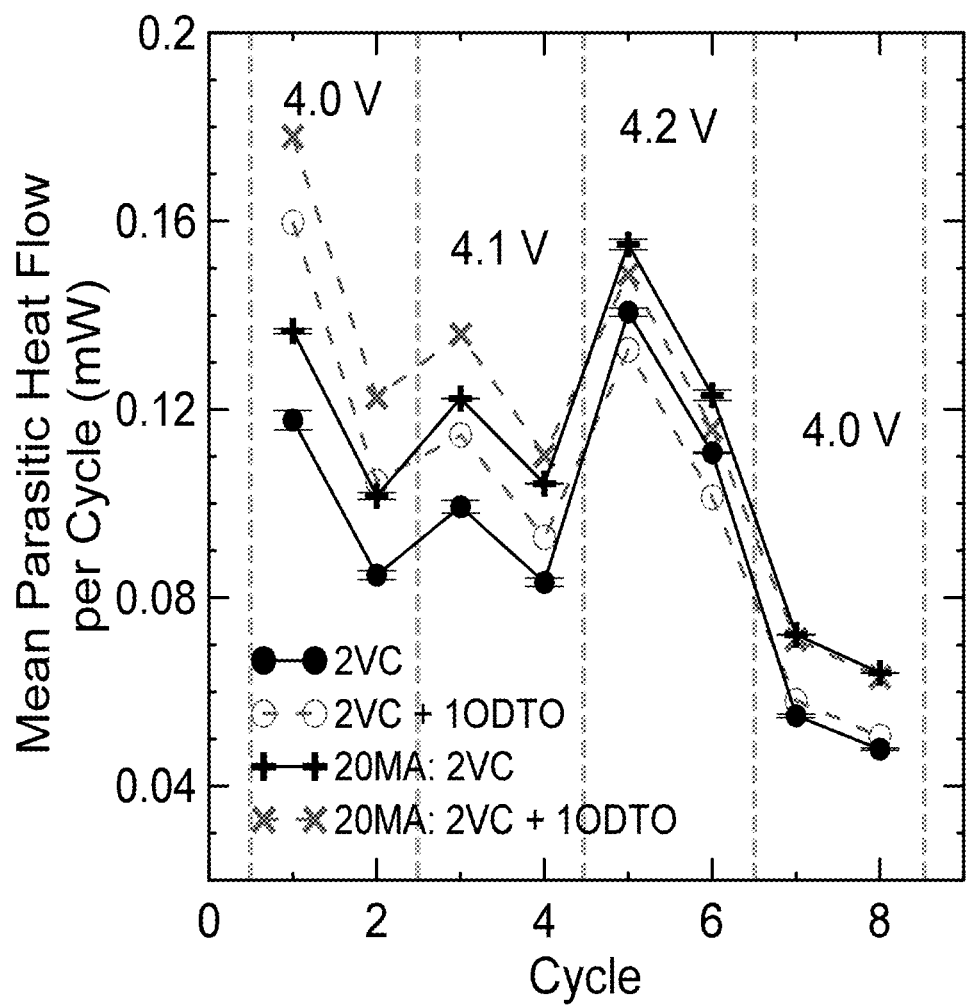

FIG. 15 illustrates mean parasitic heat flow per cycle in experiments involving various electrolyte additive systems in a Panasonic 1030 cell.

Figure 16:
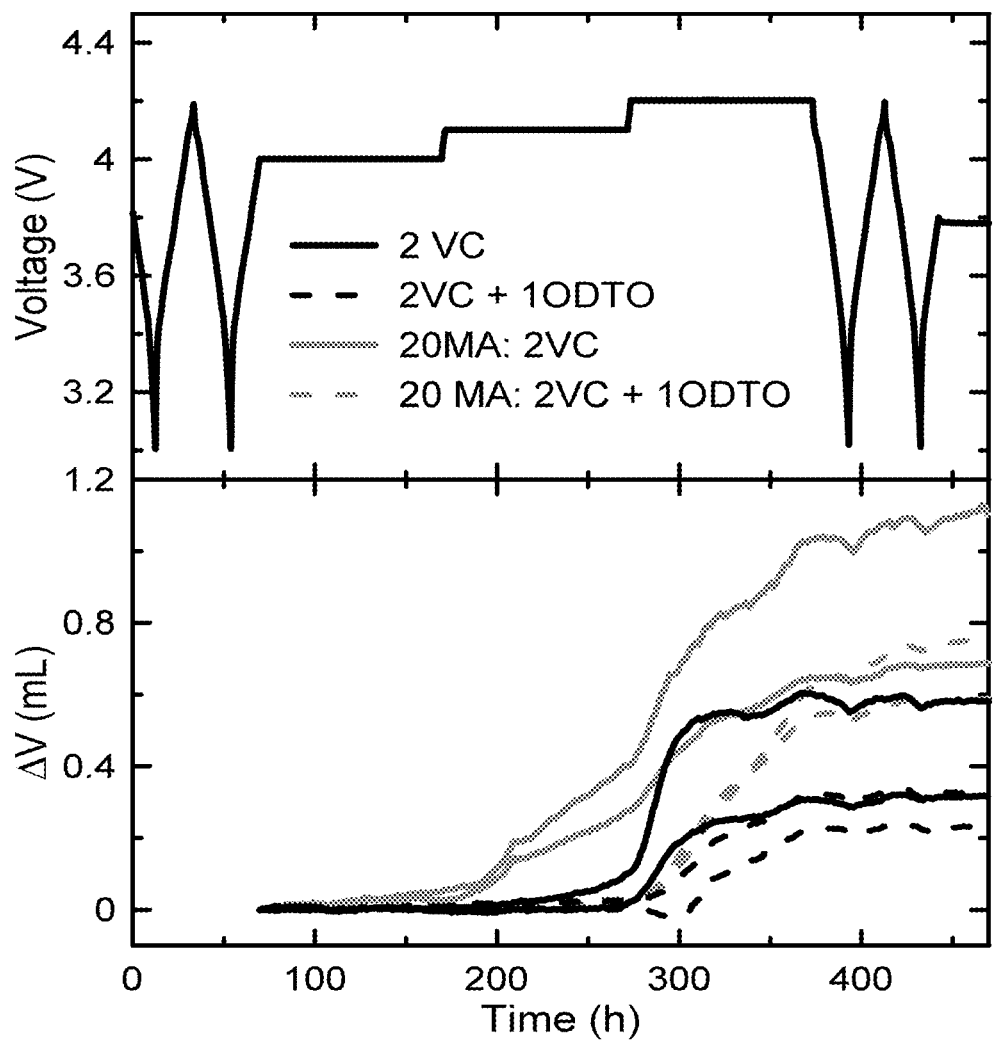

FIG. 16 illustrates the change in voltage over time and gas volume in experiments involving various electrolyte additive systems in a Panasonic 1030 cell.

Figure 17:
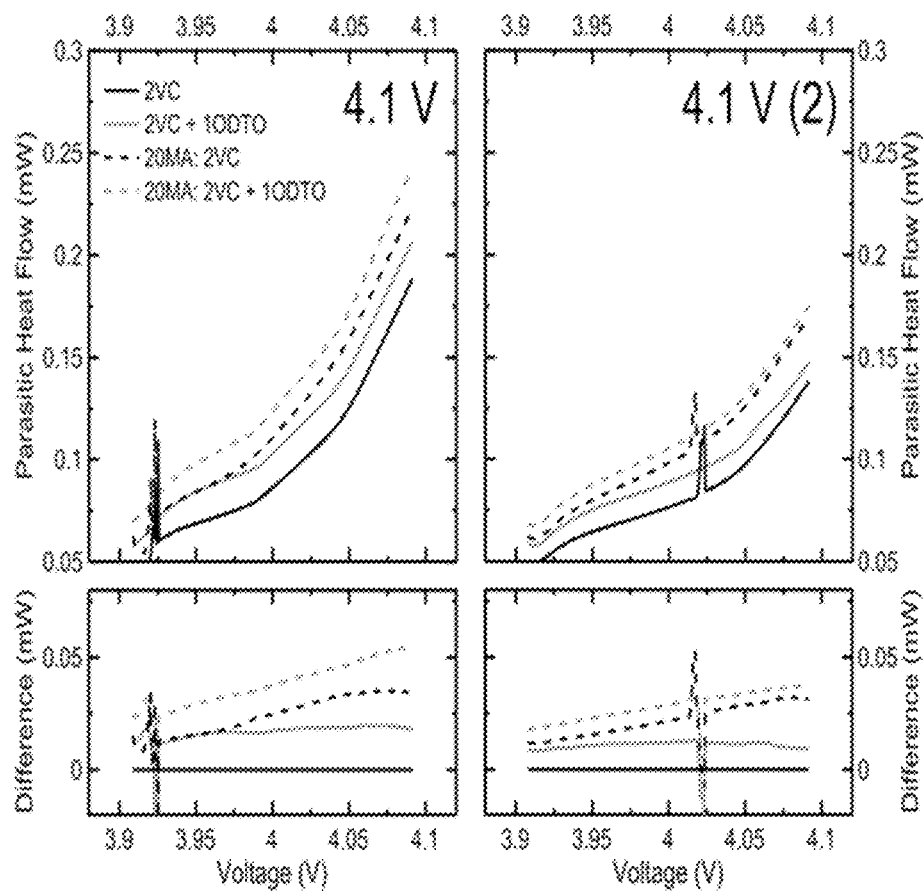

FIG. 17 illustrates the parasitic heat flow in experiments involving various electrolyte additive systems in a Panasonic 1030 cell.

DETAILED DESCRIPTION OF THE DISCLOSURE

Figure 1:
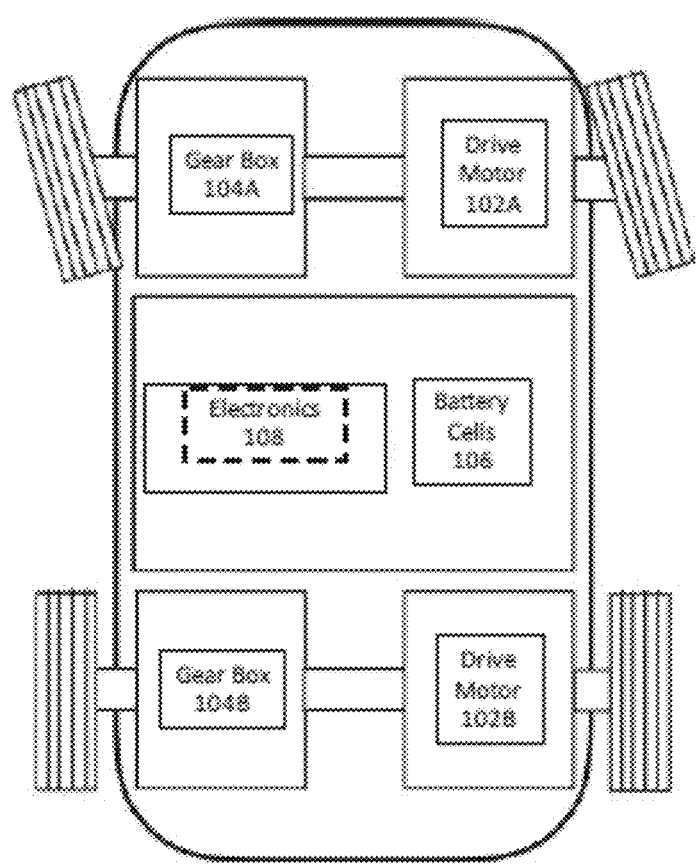
FIG. 1 is a schematic diagram of a vehicle containing a battery storage system.

FIG. 1 illustrates the basic components of a battery powered electric vehicle (electric vehicle) 100. The electric vehicle 100 includes at least one drive motor (traction motor) 102A and/or 102B, at least one gear box 104A and/or 104B coupled to a corresponding drive motor 102A and/or 102B, battery cells 106 and electronics 108. Generally, the battery cells 106 provide electricity to power electronics of the electric vehicle 100 and to propel the electric vehicle 100 using the drive motor 102A and/or 102B. The electric vehicle 100 includes a large number of other components that are not described herein but known to one or ordinary skill. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles. Certain parts created using embodiments of the present disclosure may be used in vehicle 100.

Figure 2:
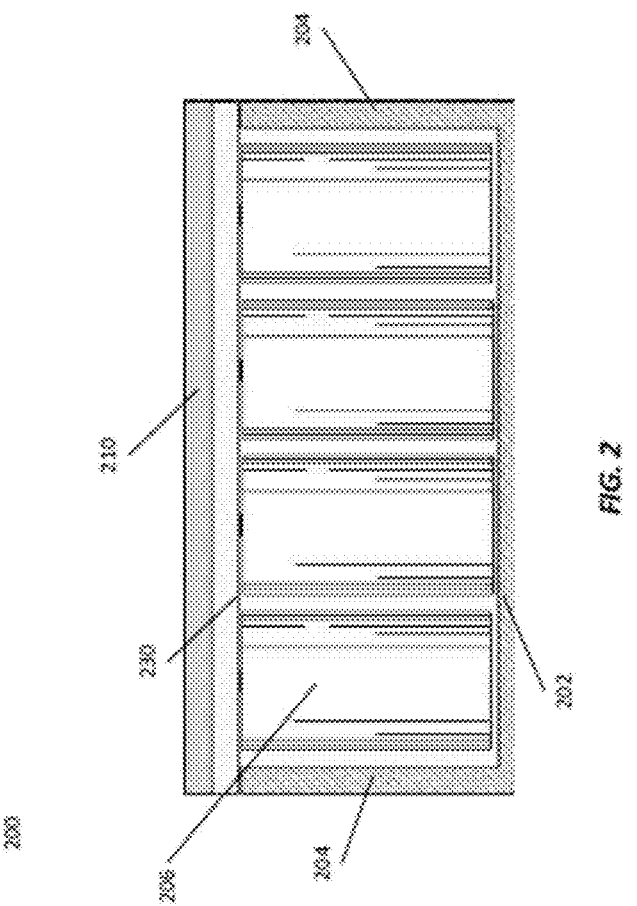
FIG. 2 is a schematic diagram of an exemplary battery storage system.

FIG. 2 illustrates a schematic view of an exemplary energy storage system 200 showing various components. The energy storage system 200 typically includes a modular housing with at least a base 202 and four side walls 204 (only two shown in the figure). The module housing is generally electrically isolated from the housed battery cells 206. This may occur through physical separation, through an electrically insulating layer, through the choice of an insulating material as the module housing, any combination thereof, or another through another method. The base 202 may be an electrically insulating layer on top of a metal sheet or a nonconductive/electrically insulating material, such as polypropylene, polyurethane, polyvinyl chloride, another plastic, a nonconductive composite, or an insulated carbon fiber. Side walls 204 may also contain an insulating layer or be formed out of a nonconductive or electrically insulating material, such as polypropylene, polyurethane, polyvinyl chloride, another plastic, a nonconductive composite, or an insulated carbon fiber. One or more interconnect layers 230 may be positioned above the battery cells 206, with a top plate 210 positioned over the interconnect layer 230. The top plate 210 may either be a single plate or be formed from multiple plates.

Figure 3:
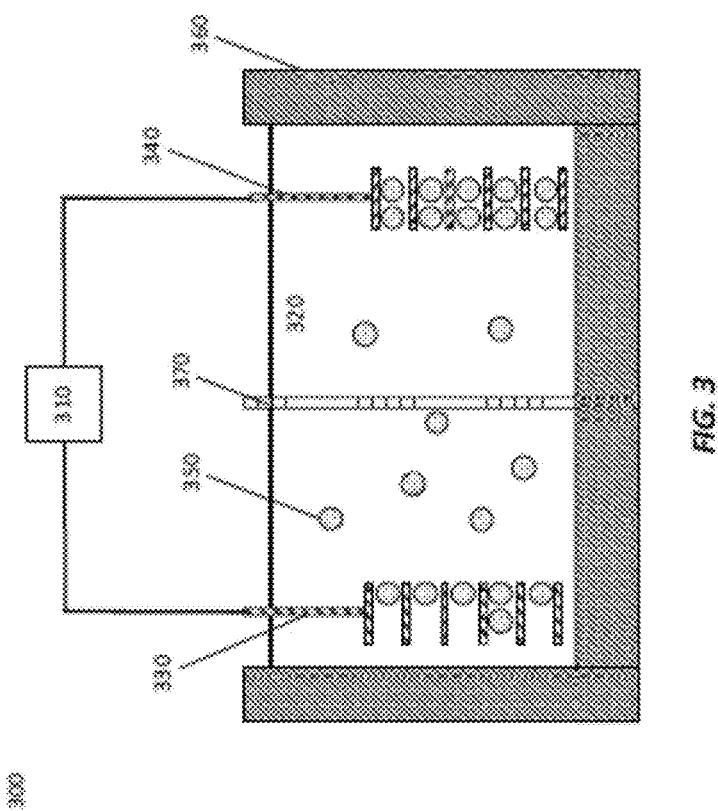
FIG. 3 is a schematic diagram of a lithium-ion, battery-cell system.

Individual battery cells 106 and 206 often are lithium-ion battery cells, with an electrolyte containing lithium ions and positive and negative electrodes. FIG. 3 illustrates a schematic of a lithium ion cell 300. Lithium ions 350 are dispersed throughout electrolyte 320, within container 360. Container 360 may be part of a battery cell. The lithium ions 350 migrate between positive electrode 330 and negative electrode 340. Separator 370 separates the negative electrode and positive electrode. Circuitry 310 connects the negative electrode and positive electrode.

New studies by the inventors have identified novel electrolyte and battery systems for use in grid and electric vehicle applications. These systems are based on two-additive electrolyte systems combined with solvents and electrodes, including vinylene carbonate (VC) combined with 1,2,6-oxodithiane-2,2,6,6-tetraoxide (ODTO), $LiPO_2F_2$ combined with ODTO and fluoroethylene carbonate (FEC) combined with ODTO. These two-additive electrolyte systems are paired with a positive electrode made from lithium nickel manganese cobalt oxide with the composition $LNi_xMn_yCo_zO_2$ (abbreviated NMC generally or NMCxyz where the x, y, and z are the molar ratios of nickel, manganese and cobalt respectively. In certain embodiments, the positive electrode is formed from NMC111, NMC532, NMC811, or NMC622. In certain embodiments, NMC532 positive electrodes formed from single-crystal, micrometer-side particles, which resulted in an electrode with micrometer-size areas of continuous crystal lattice (or grains), have been shown to be particularly robust, in part because the materials and processing conditions result in larger grain sizes than using conventional materials and processing conditions.

Typical processing conditions lead to NMC electrodes with nanometer-sized particles packed into larger micrometer-sized agglomerates, creating grain boundaries on the nanometer scale. Grain boundaries are defects that tend to reduce desirable properties (for example, electrical properties), so it is typically desirable to reduce the number of grains and increase the grain size. Processing can create larger domains, on the micrometer size scale, thereby reducing the number of grain boundaries in the NMC electrodes, increasing electrical properties. The increase in properties is results in more robust battery systems. In certain embodiments, other NMC electrodes may be processed to create larger domain sizes (on the micrometer-size scale or larger), for example, NMC111, NMC811, NMC622, or another NMC compound to create more robust systems.

The positive electrode may be coated with a material such as aluminum oxide ($Al_2O_3$), titanium dioxide ($TiO_2$), or another coating. Coating the positive electrode is advantageous because it can help reduce interfacial phenomena at the positive electrode, such as parasitic reactions, or another phenomenon, that can deteriorate the cell containing the coated material. The negative electrode may be made from natural graphite, artificial graphite, or another material.

The electrolyte may be a lithium salt dissolved (such as $LiPF_6$) in a combination of organic or non-aqueous solvents, including ethylene carbonate, ethyl methyl carbonate, methyl acetate, propylene carbonate, dimethyl carbonate, diethyl carbonate, another carbonate solvent (cyclic or acyclic), another organic solvent, and/or another non-aqueous solvent. Solvents are present in concentrations greater than the additives, typically greater than 5% by weight or 6% by weight. While the experimental data was generated using an electrolyte solvent that included EC:EMC:DMC 25:5:70 by volume (with or without methyl acetate (MA)), these solvents are merely exemplary of other carbonate solvents in particular and to other non-aqueous solvents. EC and EMC solvents were used in the experiments to control the systems tested in order to understand the effects of the additives and electrodes. Electrolyte systems may therefore may use other carbonate solvents and/or other non-carbonate solvents, including propylene carbonate, ethylene carbonate, dimethyl carbonate, ethyl methyl carbonate, diethyl carbonate, another carbonate solvent (cyclic or acyclic), another organic solvent, and/or another non-aqueous solvent. Solvents are present in concentrations greater than the additives, typically greater than 5% by weight or 6% by weight.

In the two-additive mixture FEC+ODTO, the concentration of FEC is preferentially between 0.5 to 6% by weight and the concentration of the ODTO is preferentially between 0.25 to 5% by weight. In the two-additive mixture VC+ODTO, the concentration of VC is preferentially between 0.5 to 6% by weight and the concentration of the ODTO is preferentially between 0.25 to 5% by weight. In the two-additive mixture LFO+ODTO, the concentration of LFO is preferentially between 0.5 to 1.5% by weight and the concentration of the ODTO is preferentially between 0.25 to 5% by weight.

Certain of these new battery systems may be used in energy-storage applications and also automobile application (including energy storage within an electric vehicle) in which charge and discharge speeds, and lifetime when charging and discharging quickly are important.

Pre-Experimental Setup

Although the battery systems themselves may be packaged differently according to the present disclosure, the experimental setup typically used machine made "sealed cells" to systematically evaluate the battery systems using a common setup, including the two-additive electrolyte systems and the specific materials for use the positive and negative electrodes. All percentages mentioned within this disclosure are weight percentages unless otherwise specified. A person of skill in the art will appreciate that the type of additive to be used and the concentration to be employed will depend on the characteristics which are most desirably improved and the other components and design used in the lithium ion batteries to be made and will be apartment from this disclosure.

Sealed Battery Cells

The NMC/graphite sealed cells used in the experimental setup contained 1 M LiPF$_6$ in the solvent to which additives were added. The electrolyte consisted of 1 M LiPF$_6$ in 30% EC and 70% EMC. The concentration of the electrolyte components may be modified to include MA and/or DMC. To this electrolyte, the additive components were added at specified weight percentages.

The Panasonic 1030 sealed cells used in the experimental setup contained an electrolyte solvent that consisted of 1.2 M LiPF$_6$ added to EC, EMC and DMC in volume ratios of 25:5:70. To this electrolyte, the additive components were added at specified weight percentages.

The sealed NMC/graphite cells used a positive electrode made of NMC532 with micrometer-sized grains (sometimes referred to as single-crystal NMC532), and a negative electrode made of artificial graphite, unless otherwise specified. To test certain battery systems, other positive, including standard NMC532 (with smaller grains than the NMC with micrometer-sized grains) and NMC622, and negative electrodes (including natural graphite) were used.

Before electrolyte filling, the sealed cells were cut open below the heat seal and dried at 100° C. under vacuum for 12 hours to remove any residual water. Then the cells were transferred immediately to an argon-filled glove box for filling and vacuum sealing and then were filled with electrolyte. After filling, cells were vacuum-sealed.

After sealing, the sealed cells were placed in a temperature box at 40.0+/−0.1° C. and held at 1.5 V for 24 hours to allow for the completion of wetting. Then, sealed cells were subjected to the formation process. Unless specified otherwise, the formation process for NMC/graphite cells consisted of charging the sealed cells at 11 mA (C/20) to 4.2 V and discharging to 3.8 V. C/x indicates the that the time to charge or discharge the cell at the current selected is x hours when the cell has its initial capacity. For example, C/20 indicates that a charge or discharge would take 20 hours. After formation, cells were transferred and moved into the glove box, cut open to release any generated gas and then vacuum sealed again and the appropriate experiments were performed.

The formation process for the Panasonic 1030 cells for the cycling and storage experiments consisted of charging the sealed cells at C/2 at 40° C. for one hour; storing the cells at 60° C. for 22 hours; charging the cells to 4.2 V and discharging to 3.8 V at C/2 at 40° C. After formation, cells were transferred and moved into the glove box, cut open to release any generated gas and then vacuum sealed again and the appropriate experiments were performed.

The formation process for the Panasonic 1030 cells for the charging profile and in-situ gas volume measurement experiments consisted of charging the sealed cells at C/20 at 40° C. to 4.2 V and discharging to 3.8 V at C/20 at 40° C. while they were connected to the in-situ gas measuring apparatus.

Passivation Impact

The passivation impact of various electrolyte compositions in different types of cells is illustrated in FIGS. 4A-4E. As seen from the data in FIGS. 4A-4E, ODTO shows similar passivation impact in five different types of cells. In the first and second cells (FIGS. 4A-4B), the passivation impact of ethylene carbonate (EC):ethyl methyl carbonate (EMC) (control), 2% VC, 1% ODTO, 3% ODTO, 5% ODTO, 2% VC+1% ODTO, 2% FEC+1% ODTO, and 1% LFO+1% ODTO in a cell with an uncoated NMC532 positive electrode (FIG. 4A) and an artificial graphite negative electrode are compared and in a cell with a coated NMC532 positive electrode (FIG. 4B) and an artificial graphite electrode, is shown. In the third and fourth cells (FIGS. 4C-4D), the passivation impact of 2% VC, 1% LFO+1% ODTO, 2% FEC+1% ODTO, 2% VC+1% ODTO, 1% ODTO, 3% ODTO, and 5% ODTO in a cell with Al$_2$O$_3$-coated NMC622/artificial graphite electrode (FIG. 4C) and a cell with an AFO-coated NMC622 electrode (FIG. 4D), is shown. And in the fifth cell (FIG. 4E), the passivation impact of EC:EMC:DMC, 2% VC, 2% VC+1% ODTO, 2% VC+3% ODTO, is shown. The peak at approximately 2.3 V corresponds to the reduction of ODTO when 1% ODTO is present (passivation peak). The effect of the 1% ODTO additive is independent of the type of positive electrode used, as demonstrated by a similar peak in FIGS. 4C-4E, which are directed to data for an Al$_2$O$_3$-coated NMC622 positive electrode, an AFO-coated NMC622 positive electrode, and an electrode as found in the Panasonic 1030 cell, respectively.

Cell Impedance

The two-additive electrolyte systems and novel battery systems disclosed herein have low cell impedance. Minimizing cell impedance is desirable since cell impedance decreases the energy efficiency of a cell. Conversely, low impedance leads to a higher possible charging rate and higher energy efficiency.

Cell impedance was measured using electrochemical impedance spectroscopy (EIS). Cells were charged or discharged to 3.80 V before they were moved to a 10.0+/−0.1° C. temperature box. AC impedance spectra were collected with ten points per decade from 100 kHz to 10 mHz with a signal amplitude of 10 mV at 10.0+/−0.1° C. From the measured AC impedance, the charge transfer resistance ($R_{ct}$) was calculated and plotted.

In certain embodiments, two-additive electrolyte systems, the concentration of each additive about 0.25-6%, form part of the battery system. FIGS. 5A-5E show experimental data of cell charge transfer impedance experiments for two-additive electrolyte systems consisting of 1% ODTO, 3% ODTO, 5% ODTO, 2% VC+1% ODTO, 2% FEC+1% ODTO, 1% LFO+1% ODTO, 2% VC, 2% FEC, and 1% LFO in a cell with an uncoated NMC532 positive electrode and an artificial graphite negative electrode (FIG. 5A); 1% ODTO, 3% ODTO, 5% ODTO, 2% VC+1% ODTO, 2% FEC+1% ODTO, 1% LFO+1% ODTO, 1% LFO+1% ODTO+1% VC, 1% LFO+1% ODTO+1% FEC, 1% LFO+1% ODTO+1% TTSPi, 2% VC, 2% FEC, and 1% LFO in a cell with a coated NMC532 positive electrode and an artificial graphite negative electrode (FIG. 5B); 1% ODTO, 3% ODTO, 5% ODTO, 2% VC+1% ODTO, 2% FEC+1% ODTO, 1% LFO+1% ODTO, 2% VC, and 2% FEC in a cell with an Al2O3-coated NMC622 positive electrode and an artificial graphite negative electrode (FIG. 5C); 1% ODTO, 3% ODTO, 5% ODTO, 2% VC+1% ODTO, 2% FEC+1% ODTO, 1% LFO+1% ODTO, 2% VC, and 2% FEC in a cell with a AFO-coated NMC622 positive electrode and an artificial graphite negative electrode (FIG. 5D); and 2% VC, 2% VC+1% ODTO, 2% FEC+3% ODTO in a Panasonic 1030 cell (FIG. 5E). An artificial graphite negative electrode was used in each of these electrochemical cells.

The cell charge transfer impedance ($R_{ct}$) was also studied for these cells. As shown by the data in FIGS. 6A-6E, cell charge transfer impedance is reduced by 1% ODTO, alone or in combination of 2% FEC, 2% VC or 1% LFO, compared to electrolytes containing 3% ODTO or 5% ODTO.

Therefore, these novel two-additive electrolyte systems do not sacrifice significant charge transfer impedance performance by including ODTO.

Gas Volume Measurements

The formation process is performed prior to cells being used in their intended application, such as grid storage or energy storage in an automobile, such as an electric vehicle. During formation, cells are subject to a precisely controlled charge and discharge cycle, which is intended to activate the electrodes and electrolyte for use in their intended application. During formation, gas is generated. If sufficient amounts of gas are generated (depending on the specific tolerances allowed by the cell and cell packaging), the gas may need to be released after the formation process and prior to application use. This typically requires the additional steps of breaking of a seal followed by a resealing. While these steps are common for many battery systems, it is desirable to remove them if possibly by choosing a system that produces less gas.

Gas volume experiments proceeded as follows: Ex-situ (static) gas measurements were used to measure gas evolution during formation and during cycling. The measurements were made using Archimedes' principle with cells suspended from a balance while submerged in liquid. The changes in the weight of the cell suspended in fluid, before and after testing are directly related to the volume changes by the change in the buoyant force. The change in mass of a cell, $\Delta m$, suspended in a fluid of density, $\rho$, is related to the change in cell volume, $\Delta v$, by $\Delta v = -\Delta m/\rho$. The gas generated during charge-discharge and during high potential hold periods was measured using the in-situ gas measuring device described by Aiken et al. (C. P. Aiken, J. Xia, David Yaohui Wang, D. A. Stevens, S. Trussler and J. R. Dahn, J. Electrochem. Soc. 2014 volume 161, A1548-A1554).

In certain embodiments, two-additive electrolyte systems, the concentration of each additive of about 0.25-6%, form part of the battery system. FIGS. 7A-7E shows the results of gas-generation experiments in two-additive electrolyte systems consisting of 1% ODTO, 3% ODTO, 5% ODTO, 2% VC+1% ODTO, 2% FEC+1% ODTO, 1% LFO+1% ODTO, 2% VC, 2% FEC, and 1% LFO in a cell with an uncoated NMC532 positive electrode and an artificial graphite negative electrode(FIG. 7A); 1% ODTO, 3% ODTO, 5% ODTO, 2% VC+1% ODTO, 2% FEC+1% ODTO, 1% LFO+1% ODTO, 2% VC, 2% FEC, and 1% LFO in a cell with a coated NMC532 positive electrode and an artificial graphite negative electrode(FIG. 7B); 1% ODTO, 3% ODTO, 5% ODTO, 2% VC+1% ODTO, 2% FEC+1% ODTO, 1% LFO+1% ODTO, 2% VC, and 2% FEC in a cell with an Al2O3-coated NMC622 positive electrode and an artificial graphite negative electrode (FIG. 7C); 1% ODTO, 3% ODTO, 5% ODTO, 2% VC+1% ODTO, 2% FEC+1% ODTO, 1% LFO+1% ODTO, 2% VC, and 2% FEC in a cell with a coated NMC622 positive electrode and an artificial graphite negative electrode(FIG. 7D); 2% VC, 2% VC+1% ODTO, and 2% VC+3% ODTO in a Panasonic 1030 cell (FIG. 7E). An artificial graphite negative electrode was used in each of these electrochemical cells. In each of these cells, the amount of gas generated was measured according to the procedure described above. As shown in FIGS. 7A-7E, significant amounts of gas was produced in the cells with 1% ODTO or 1% LFO+1% ODTO. However, gas production was significantly reduced in the cells with 2% VC+1% ODTO and 2% FEC+1% ODTO.

Storage Experiments

After formation, cells were discharged to 3 V and charged to 4.4 V twice with a current corresponding to C/10. Cells were then held 4.4 V for 24 h and afterwards transferred to a storage box at 60° C. The open-circuit voltage was recorded automatically every 6 h during a period of 500 h. FIGS. 8A and 8B show that cells incorporating 2VC+1ODTO had the smallest amounts of self-discharge under these conditions.

Ultrahigh Precision Cycling

To study the effectiveness of the battery systems of the present disclosure, including the operative electrolyte additives and electrodes, ultrahigh precision cycling (UHPC) was performed. The standard UHPC procedure consisted of cycling cells between 3.0 and 4.3 V at 40° C. using a current corresponding to C/20 for 15 cycles to produce the data. UPHC is employed to measure the coulombic efficiency, charge endpoint capacity slippage and other parameters to an accuracy of 30 ppm, in the case of the coulombic efficiency. Details of the UHPC procedure are described in T. M. Bond, J. C. Burns, D. A. Stevens, H. M. Dahn, and J. R. Dahn, *Journal of the Electrochemical Society*, 160, A521 (2013), which is incorporated herein in its entirety.

Metrics measured and/or determined from the UHPC measurements of particular interest include the following: coulombic efficiency, normalized coulombic inefficiency, normalized charge endpoint capacity slippage, normalized discharge capacity (or fade rate), and delta V. Coulombic efficiency is the discharge capacity ($Q_d$) divided by charge capacity ($Q_c$) of the previous cycle. It tracks the parasitic reactions happening at the in the Li-ion cell and includes contributions from both the positive and negative electrodes. A higher CE value indicates less electrolyte degradation in the cell. Coulombic inefficiency per hour (CIE/h) is a normalized (per hour) coulombic inefficiency where the coulombic inefficiency is defined as 1-CE. It is calculated by taking 1-CE and dividing by the time of the cycle for which the CE was measured. Charge endpoint capacity motion (or slippage) tracks the parasitic reactions occurring at the positive electrode as well as the positive material mass loss, if any. Less motion is better and relates to less electrolyte oxidation. Normalized discharge capacity, or fade rate, is another important metric, with a lower fade rate desirable and normally indicative of a battery system with a longer lifetime. $\Delta V$ is calculated as the difference between the average charge voltage and average discharge voltage. $\Delta V$ change relates closely to polarization growth with lower $\Delta V$ change as cycling occurs is preferable. UHPC measurements are particularly appropriate for comparing electrolyte compositions because it allows for the tracking of metrics with a higher accuracy and precision and allows for the evaluation of various degradation mechanisms in a relatively rapid fashion.

Here, UHPC experiments were performed using 1% ODTO, 3% ODTO, 5% ODTO, 1% ODTO+2% VC, 1% ODTO+2% FEC, 1% ODTO+1% LFO, 2% VC, 2% FEC, 2% VC, 20% MA+2% VC, 20% MA+2% VC+1% ODTO, and 1% LFO. The material of the positive electrodes of the five different cells studied included uncoated (FIG. 11) and coated NMC 532 (FIG. 12) and Al$_2$O$_3$-coated NMC 622 (FIG. 13) and AFO-coated NMC622 (FIG. 14), and Panasonic 1030 cells. Raw data is shown in FIGS. 10D and 10E for the coated NMC532 cells. Raw data is shown in FIGS. 10J and 10K for uncoated NMC532 cells. Raw data is shown in FIGS. 10O and 10P for Al$_2$O$_3$-coated NMC622 cells. Raw data is shown for AFO-coated NMC622 cells in FIGS. 10Q and 10R. Raw data is shown for Panasonic 1030 cells in FIG. 10U.

In certain embodiments, two-additive electrolyte systems, the concentration of each additive of about 0.25-6%, form part of the battery system. The battery systems may also include positive electrodes made from NMC111, NMC532, NMC811, NMC622, or another NMC composition (NMCxyz). In certain embodiments, positive electrodes made from NMC532 with micrometer-scale grains have been shown to be particularly robust, in part because processing conditions created larger the grain sizes than typically processing conditions create.

Typical processing conditions lead to NMC electrodes with nanometer-sized particles packed into larger micrometer-sized agglomerates, creating grain boundaries on the nanometer scale. Grain boundaries are defects that tend to reduce desirable properties (for example, electrical properties), so it is typically desirable to reduce the number of grains and increase the grain size. Current processing can create larger domains, on the micrometer size scale, thereby reducing the number of grain boundaries in the NMC electrodes, increasing electrical properties. The increase in properties is results in more robust battery systems. In certain embodiments, other NMC electrodes may be processed to create larger domain sizes (on the micrometer-size scale or larger), for example, NMC111, NMC811, NMC622, or another NMC compound to create more robust systems.

Long Term Cycling

Lifetime of a battery system is an important property of a battery system. Charging and discharging rates can affect lifetime. Long term cycling experiments help determine how resilient battery systems are over time under anticipated operation conditions. It is important to select battery systems that have sufficient lifetimes for the desired application.

Embodiments of the present disclosure exhibit desirable long term cycling for different applications, including grid and vehicle storage. Specifically, two-additive electrolyte systems of VC+ODTO, LFO+ODTO, and FEC+ODTO are particularly relevant for automobile applications (especially energy storage within an electric vehicle) in which charging and discharging rates are typically higher than for grid-storage applications.

In the long-term-cycling experiments, single-crystal NMC532 and NMC 622 were typically used as the positive electrode (unless otherwise specified) and artificial graphite was used as the negative electrode (unless otherwise specified), as well as Panasonic 1030 cells. Before the long term cycling experiments, sealed cells were subjected to the formation processes as described above for each cell type. After formation, cells were cycled on a Neware charging systems.

In some experiments, cells were housed in a temperature controlled box at 40° C.+/−0.2° C. The cells were cycled between 3.0 V and the top of charge (4.2 V or 4.3 V) with a current of C/3 (half cycle of 3 h), and a constant voltage step at the top of charge until the current dropped below C/20. Every 50 cycles, cells underwent one full cycle at C/20. Results from such experiments for coated NMC532 are shown in FIGS. 10A, 10B, 10C, 10V(b), and 10W(b) for uncoated NMC532 are shown in FIGS. 10V(a) and 10W(a), for $Al_2O_3$-coated coated NMC622 at FIGS. 10L, 10V(c), and 10W(c), for AFO-coated NMC622 at FIGS. 10M, 10N, 10V(d), 10W(d) and for Panasonic 1030 at FIG. 10T(b).

In some experiments, cells were housed in a temperature controlled box at 55° C.+/−0.2° C. The cells were cycled between 3.0 V and the top of charge (4.2 V or 4.3 V) with a current of C/3 (half cycle of 3 h), and a constant voltage step at the top of charge until the current dropped below C/20. Every 50 cycles, cells underwent one full cycle at C/20. Results from such experiments for coated NMC532 are shown in FIGS. 10F and 10G, and for Panasonic 1030 at FIGS. 10S and 10T(c).

In some experiments, cells were housed in a temperature controlled box at 20° C.+/−0.2° C. The cells were cycled between 3.0 V and the top of charge (4.2 V or 4.3 V) with a current of C/3 (half cycle of 3 h), and a constant voltage step at the top of charge until the current dropped below C/20. Every 50 cycles, cells underwent one full cycle at C/20. Results from such experiments for coated NMC532 are shown in FIG. 10H, and for Panasonic 1030 at FIG. 10T(a).

In some experiments, cells were housed in a temperature controlled box at 20° C.+/−0.2° C. The cells were cycled between 3.0 V and the top of charge (4.2 V or 4.3 V) with a current of 1C (a charge takes one hour, and a discharge takes one hour), and a constant voltage step at the top of charge until the current dropped below C/20. Every 50 cycles, cells underwent one full cycle at C/20. Results from such experiments for coated NMC532 are shown in FIG. 10I.

The experimental data shows that the two-additive electrolyte systems (ODTO+FEC, ODTO+LFO, and DTD+VC) experience less capacity loss when cycling to 4.2 or 4.3 V and also lower polarization growth compared to the single additive electrolyte systems of VC or FEC, and the cycling is similar to 2% VC+1% DTD and 1% LFO+2FEC.

Additional studies were conducted with the Panasonic 1030 cells, including studies of the mean parasitic heat flow per cycle (FIGS. 15, 17, and 9), and assessment of in-situ gas during charge-hold shown in FIG. 16.

Gas volume experiments proceeded as follows: Ex-situ (static) gas measurements were used to measure gas evolution during formation and during cycling. The measurements were made using Archimedes' principle with cells suspended from a balance while submerged in liquid. The changes in the weight of the cell suspended in fluid, before and after testing are directly related to the volume changes by the change in the buoyant force. The change in mass of a cell, Δm, suspended in a fluid of density, p, is related to the change in cell volume, Δv, by $\Delta v = -\Delta m/\rho$. The gas generated during charge-discharge and during high potential hold periods was measured using the in-situ gas measuring device described by Aiken et al. (C. P. Aiken, J. Xia, David Yaohui Wang, D. A. Stevens, S. Trussler and J. R. Dahn, J. Electrochem. Soc. 2014 volume 161, A1548-A1554).

The results in FIG. 16 showed that ODTO is beneficial in suppressing gas at high voltage without or with 20% MA during charge/hold.

Microcalorimetry Measurements

Microcalorimetry measures heat flow to the cell during operation. The heat flow to the cell is a combination of three different effects: (1) ohmic heating, (2) entropy changes due to Li intercalating in the electrodes, and (3) parasitic reactions (electrolyte, including additive, degradation at either electrode). Because the test cells contain the same physical design, different only in the electrolyte, the difference in heat flow is primarily due to the differences in parasitic heat flow. Nevertheless, the parasitic heat flow can be extracted from the total heat flow using the procedures developed by Downie et al. (*Journal of the Electrochemical Society*, 161, A1782-A1787 (2014)) and by Glazier et al. (*Journal of the Electrochemical Society*, 164 (4) A567-A573 (2017)). Both of these references are incorporated herein in their entirety. Cells that have lower parasitic heat flow during cycling have better lifetimes. The voltage dependence of the parasitic reaction rate may be observed by plotting the measured parasitic heat flow as a function of cell voltage.

Microcalorimetry Measurement Procedure: Two cells of each electrolyte were connected to a Maccor charger and inserted into a TAMIII Microcalorimeter (TA Instruments, stability +/−0.0001° C., accuracy +/−1 µW, precision +/−1 nW) at 40.0° C. The baseline drift over the course of the experiments did not exceed +/−0.5 µW. All specifications and information regarding microcalorimetry calibration, cell connections, and operation procedures can be found in previous literature. (For example, Downie et al, *ECS Electrochemical Letters* 2, A106-A109 (2013).) Cells were cycled four times at a C/20 rate between 3.0 V and 4.2 V to ensure well-formed, stable SEIs and were then charged between 4.0 V and different upper cut off limits at 3.7 mA (C/100) to investigate the performance and the parasitic heat flow in different voltage ranges. Each pair of cells yielded near identical performance, so only one set of heat flow data is presented for each electrolyte.

The 3.7 mA cycling protocol was:
1. Charge to 4.0 V, discharge to 3.9 V, repeat
2. Charge to 4.1 V, discharge to 3.9 V (repeat)
3. Charge to 4.2 V, discharge to 3.9 V (repeat)
6. Charge to 4.0 V, discharge to 3.9 V (repeat)

The experimental data shown in FIGS. 15, 17 and 9 is for Panasonic 1030 cells were used which contained the electrolyte additives 2VC, 2VC+1ODTO, 2VC with 20% MA and 2VC+1ODTO with 20% MA. The utility of ODTO is observed when cells are tested between 3.9 and 4.2 V. In this situation, the parasitic heat flow is reduced suggesting Panasonic 1030 cells with 1% ODTO will have longer lifetimes when charged to 4.2 V (full state of charge). This is important to extend the lifetime of the battery pack in years or miles driven.

In certain embodiments, the positive electrode is formed from NMC111, NMC532, NMC822, NMC622, and/or NMCxyz. In particular, positive electrodes made from single-crystal NMC532 have been shown to be particularly robust, in part because the grain size of NMC532 is larger than the grain size of other standard NMC materials that are more polycrystalline, having smaller grain sizes.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims. Reference to additives in the specification are generally to operative additives unless otherwise noted in the specification.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Reference to "about" or "approximately" is to be construed to mean plus or minus 10%. Similarly, reference to any percentage of an additive is construed to mean plus or minus 10%.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A nonaqueous electrolyte for a lithium ion battery consisting essentially of at least one lithium salt, a nonaqueous solvent, and an additive mixture, wherein the additive mixture consists essentially of a first operative additive selected from the group consisting of fluoroethylene carbonate, and a second operative additive that is 1,2,6-oxodithiane-2,2,6,6-tetraoxide having the following formula (I):

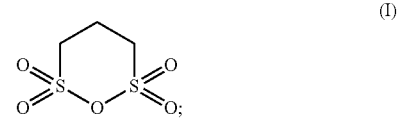

(I)

wherein the at least one lithium salt comprises $LiPF_6$ having a concentration of at most about 1.2 M;
wherein a concentration of the first operative additive is 1% and at most 6% by weight;
wherein a concentration of the second operative additive is in a range from 0.25 to 5% by weight;
wherein a concentration of the nonaqueous solvent is greater than 6% by weight; and wherein the nonaqueous solvent is EC/EMC/DMC, wherein the ratio of EC to EMC to DMC is 25:5:70.

2. The nonaqueous electrolyte of claim 1, wherein the concentration of the first operative additive is about 2% by weight.

3. A lithium-ion battery comprising:
a negative electrode;
a positive electrode; and
a nonaqueous electrolyte consisting essentially of a lithium salt, a nonaqueous solvent, and an additive mixture consisting essentially of:
a first operative additive selected from the group consisting of vinylene carbonate, LiPO$_2$F$_2$, fluoroethylene carbonate and combinations thereof, and
a second operative additive that is 1,2,6-oxodithiane-2,2,6,6-tetraoxide having the following formula (I):

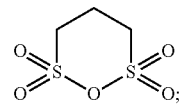

(I)

wherein the lithium salt comprises LiPF$_6$ having a concentration of at most about 1.2 M;
wherein a concentration of the first operative additive is in a range from 0.25 to 6% by weight;
wherein a concentration of the second operative additive is in a range from 0.25 to 5% by weight,
wherein a concentration of the nonaqueous solvent is greater than 6% by weight;
wherein the lithium-ion battery has at least 95% retention of initial capacity after 300 cycles between 3.0 V and 4.3 V at a charging rate of C/3 CCCV at 40° C.; and
wherein the nonaqueous solvent is EC/EMC/DMC, wherein the ratio of EC to EMC to DMC is 25:5:70.

4. The lithium-ion battery of claim 3, wherein the concentration of the first operative additive is at least 1% by weight, and the concentration of the second operative additive is 1% by weight.

5. The lithium-ion battery of claim 3, wherein the first operative additive is fluoroethylene carbonate.

6. The lithium-ion battery of claim 3, wherein the first operative additive is vinylene carbonate.

7. The lithium-ion battery of claim 3, wherein the first operative additive is LiPO$_2$F$_2$.

8. The lithium-ion battery of claim 3, wherein a volume of gas produced within the lithium-ion battery is less than or comparable to a volume of gas produced within a lithium-ion battery comprising the first operative additive and absent of the second operative additive that is 1,2,6-oxodithiane-2,2,6,6-tetraoxide.

9. The lithium-ion battery of claim 3, wherein the lithium-ion battery has at least 95% retention of initial capacity after 800 cycles between 3.0 V and 4.3 V at a charging rate of C/3 CCCV at 40° C.

10. The lithium-ion battery of claim 3, wherein the positive electrode comprises a lithium nickel manganese cobalt (NMC) active material.

11. The lithium-ion battery of claim 3, wherein the negative electrode comprises a graphite active material.

12. The lithium-ion battery of claim 3, wherein the concentration of the first operative additive is at most about 2% by weight, and the concentration of the second operative additive is at most about 1% by weight.

13. The lithium-ion battery of claim 3, wherein the volume ratio of EC in the nonaqueous solvent is 30% or less.

14. The lithium-ion battery of claim 3, wherein the first operative additive is FEC or VC, wherein the concentration of the first operative additive is about 2% by weight and the concentration of the second operative additive is in a range from 1% to 5% by weight.

15. The lithium-ion battery of claim 3, wherein the first operative additive is LiPO$_2$F$_2$, wherein the concentration of the first operative additive is about 1% by weight and the concentration of the second operative additive is in a range from 1% to 5% by weight.

16. An electric vehicle with a rechargeable battery comprising:
a drive motor;
gear box;
electronics; and
the lithium-ion battery of claim 3.

17. The electric vehicle of claim 16, wherein the concentration of the first operative additive is at least 1% by weight, and a concentration of the second operative additive is at least 1% by weight.

18. The electric vehicle of claim 16, wherein the first operative additive fluoroethylene carbonate.

19. The electric vehicle of claim 16, wherein the first operative additive is vinylene carbonate.

20. The electric vehicle of claim 16, wherein the first operative additive is LiPO$_2$F$_2$.

21. The electric vehicle of claim 16, wherein a volume of gas produced within the lithium-ion battery is less than or comparable to a volume of gas produced within a lithium-ion battery comprising the first operative additive and absent of the second operative additive that is 1,2,6-oxodithiane-2,2,6,6-tetraoxide.

22. The electric vehicle of claim 16, wherein the lithium-ion battery has at least 95% retention of initial capacity after 500 cycles between 3.0 V and 4.3 V at a charging rate of C/3 CCCV at 40° C.

23. The electric vehicle of claim 22, wherein the lithium-ion battery has at least 95% retention of initial capacity after 800 cycles between 3.0 V and 4.3 V at a charging rate of C/3 CCCV at 40° C.

* * * * *